(12) United States Patent
Loccufier

(10) Patent No.: US 10,584,258 B2
(45) Date of Patent: Mar. 10, 2020

(54) UV CURABLE INKJET INKS

(71) Applicant: AGFA NV, Mortsel (BE)

(72) Inventor: Johan Loccufier, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

(21) Appl. No.: 15/766,879

(22) PCT Filed: Oct. 10, 2016

(86) PCT No.: PCT/EP2016/074125
§ 371 (c)(1),
(2) Date: Apr. 9, 2018

(87) PCT Pub. No.: WO2017/063968
PCT Pub. Date: Apr. 20, 2017

(65) Prior Publication Data
US 2019/0062579 A1 Feb. 28, 2019

(30) Foreign Application Priority Data
Oct. 13, 2015 (EP) .................................... 15189604

(51) Int. Cl.
*B41J 11/00* (2006.01)
*C09D 11/03* (2014.01)
*B41M 5/00* (2006.01)
*C09D 11/38* (2014.01)
*C09D 11/101* (2014.01)
(Continued)

(52) U.S. Cl.
CPC ............. *C09D 11/38* (2013.01); *B41J 11/002* (2013.01); *B41M 5/0023* (2013.01); *C09D 11/033* (2013.01); *C09D 11/037* (2013.01); *C09D 11/101* (2013.01); *C09D 11/108* (2013.01); *C09D 11/322* (2013.01)

(58) Field of Classification Search
CPC ...... B41J 11/002; C09D 11/38; C09D 11/033; C09D 11/037; B41M 5/0023
See application file for complete search history.

(56) References Cited

U.S. PATENT DOCUMENTS

2011/0227992 A1* 9/2011 Matsumoto .......... C09D 11/101
347/21
2012/0225968 A1* 9/2012 Nakano ................ C08F 299/06
522/16
(Continued)

FOREIGN PATENT DOCUMENTS

EP 2 703 457 A1 3/2014
GB 1 306 587 A 2/1973
(Continued)

OTHER PUBLICATIONS

Official Communication issued in International Patent Application No. PCT/EP2016/074125, dated Jan. 5, 2017.
(Continued)

*Primary Examiner* — Jason S Uhlenhake
(74) *Attorney, Agent, or Firm* — Keating and Bennett, LLP

(57) ABSTRACT

An aqueous UV curable inkjet ink includes an aqueous medium; a photoinitiator; a thiol compound including at least two thiol groups; polymeric particles including a polymer, an oligomer, or a monomer having ethylenically unsaturated polymerizable groups; and optionally a colorant.

18 Claims, 3 Drawing Sheets

(51) Int. Cl.
*C09D 11/322* (2014.01)
*C09D 11/033* (2014.01)
*C09D 11/037* (2014.01)
*C09D 11/108* (2014.01)

(56) References Cited

U.S. PATENT DOCUMENTS

| | | | |
|---|---|---|---|
| 2012/0295076 A1* | 11/2012 | Toyoda | C09D 11/101 |
| | | | 428/195.1 |
| 2013/0053469 A1 | 2/2013 | Kappaun | |
| 2014/0002556 A1* | 1/2014 | Sato | C09D 11/30 |
| | | | 347/100 |
| 2014/0092168 A1* | 4/2014 | Ito | C09D 11/101 |
| | | | 347/21 |
| 2014/0139581 A1* | 5/2014 | Gerrits | B41J 2/2139 |
| | | | 347/14 |

FOREIGN PATENT DOCUMENTS

| | | |
|---|---|---|
| WO | 2006/083344 | 8/2006 |
| WO | 2015/031927 A1 | 3/2015 |

OTHER PUBLICATIONS

Loccufier, "UV Curable Inkjet Inks", U.S. Appl. No. 15/766,869, filed Apr. 9, 2018.

* cited by examiner

UV CURABLE INKJET INKS

CROSS REFERENCE TO RELATED APPLICATIONS

This application is a 371 National Stage Application of PCT/EP2016/074125, filed Oct. 10, 2016. This application claims the benefit of European Application No. 15189604.0, filed Oct. 13, 2015, which is incorporated by reference herein in its entirety.

BACKGROUND OF THE INVENTION

1. Field of the Invention

The present invention relates to UV curable inkjet inks and printing methods therewith.

2. Description of the Related Art

Over the last years, offset and flexographic printing systems have increasingly been replaced by industrial inkjet printing systems due to their flexibility in use, e.g. variable data printing, and due to their enhanced reliability allowing their incorporation into production lines.

Radiation curable inkjet inks have been the preferred choice of ink because high quality images can be printed even on non-absorbing ink-receivers, such as plastic foils for food packaging.

Special UV curable inkjet inks have been developed that meet the migration limits for ink components when printing on food packaging. For example, EP 2703457 A (AGFA) discloses a free radical radiation curable inkjet ink having a viscosity smaller than 30 mPa·s at 40° C. and at a shear rate of 1,000 $s^{-1}$ including a polymeric or polymerizable photoinitiator; a thiol compound; and a vitrification control monomer, wherein the vitrification control monomer includes a (meth)acrylate group and an ethylenically unsaturated functional group selected from the group consisting of a vinyl ether group, an allyl ether group and an allyl ester group; and wherein the thiol compound includes no more than six thiol groups.

However, the human nose is so sensitive that even small amounts of ink components which pose no risk to human health via migration through packaging may still have a repulsive effect on the customer for buying that food packaging. Thiol compounds are known to have an undesired smell. Furthermore, there is also some criticism that (meth) acrylates give off an unpleasant odour before and after curing, which can irritate the eyes, skin and respiratory organs.

US 2013053469 (DURST) discloses to manufacture inkjet inks by replacing (meth)acrylates by vinyl based monomers, such as vinyl esters, vinyl carbonates and vinyl carbamates. However, these monomers tend to cure much slower, causing both problems of migration and productivity loss of the printing process.

In WO 2015/031927 (DURST), an improvement is realized by attaching the polymerizable vinyl carbonate groups to the photoinitiator. Photoinitiators having a polymerizable group for meeting the low migration limits of food packaging can tolerate to have a less reactive polymerizable group, such as a vinyl carbonate group, because photoinitiators may also be incorporated in the polymeric network by the radicals formed upon UV exposure.

However, there remains a need for improved UV curable inkjet inks, not based on (meth)acrylate monomers, that exhibit good cure speed and minimal bad odour.

SUMMARY OF THE INVENTION

In order to overcome the above problems, preferred embodiments of the present invention have been realised with an aqueous UV curable inkjet ink as defined below.

It was found that by replacing a large part of the polymerizable compounds by water and by using a combination of polymeric particles and polyfunctional thiol compounds that an improvement for odour was observed in combination with a good curing speed since good physical properties, such as adhesion, scratch and solvent resistance, on non-absorbing substrates were observed.

It was also found that compounds having secondary thiol groups instead of primary thiol groups resulted in ink layers exhibiting no odour after UV curing.

Further objects of the invention will become apparent from the description hereinafter.

BRIEF DESCRIPTION OF THE DRAWINGS

FIG. 1.A shows an ink including in its aqueous medium a colorant (2) and a polymeric particle (1) charged on its surface with a photoinitiator (3) and a thiol molecule (4). FIG. 1.B shows an ink including in its aqueous medium a colorant (2), an inorganic pigment (5) and a polymeric particle (1) charged on its surface with a photoinitiator (3) and a thiol molecule (4). FIG. 1.C shows an ink including in its aqueous medium a colorant (2), a thiol pigment (6) and a polymeric particle (1) charged on its surface with a photoinitiator (3). FIG. 1.D shows an ink including in its aqueous medium a colorant (2), a polymerizable pigment (7) and a polymeric particle (1) charged on its surface with a photoinitiator (3) and a thiol molecule (4).

FIG. 2.A shows an ink including in its aqueous medium a colorant (2) and a polymeric particle (1) incorporating a photoinitiator (3) and a thiol molecule (4). FIG. 2.B shows an ink including in its aqueous medium a colorant (2) and a polymeric particle (1) incorporating a photoinitiator (3) and a thiol molecule (4), wherein the polymeric particle is fused with an inorganic pigment (5). FIG. 2.C shows an ink including in its aqueous medium a colorant (2), a thiol molecule (4) and a polymeric particle (1) incorporating a photoinitiator (3). FIG. 2.D shows an ink including in its aqueous medium a colorant (2), a thiol pigment (6) and a polymeric particle (1) incorporating a photoinitiator (3).

FIG. 3.A shows an ink including in its aqueous medium a colorant (2), a polymerizable pigment (7) and a polymeric particle (1) incorporating a photoinitiator (3) and a thiol molecule (4). FIG. 3.B shows an ink including in its aqueous medium a polymeric particle (1) incorporating a photoinitiator (3) and a thiol molecule (4), and partially a colorant (2). FIG. 3.C shows an ink including in its aqueous medium a thiol pigment (6) and a polymeric particle (1) incorporating a photoinitiator (3) and a colorant (2). FIG.

Figure 1:
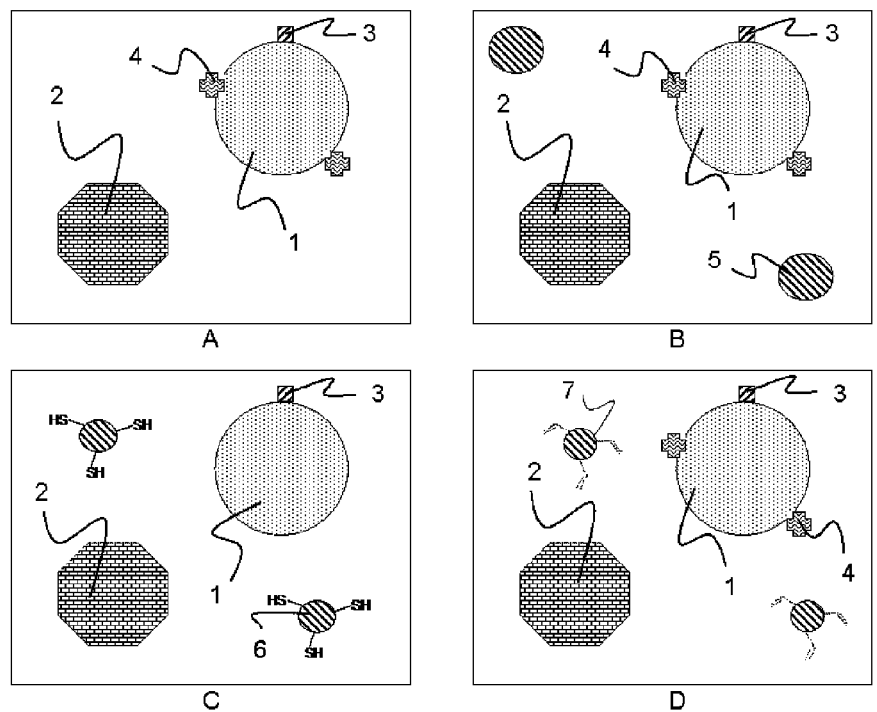
FIG. 1 shows schematical representations of preferred aqueous UV curable inkjet inks of the present invention wherein the polymeric particle (1) is a latex particle.

3.D shows an ink including in its aqueous medium a polymerizable pigment (7) and a polymeric particle (1) incorporating a photoinitiator (3) and a thiol molecule (4) and partially a colorant (2).

Figure 4:
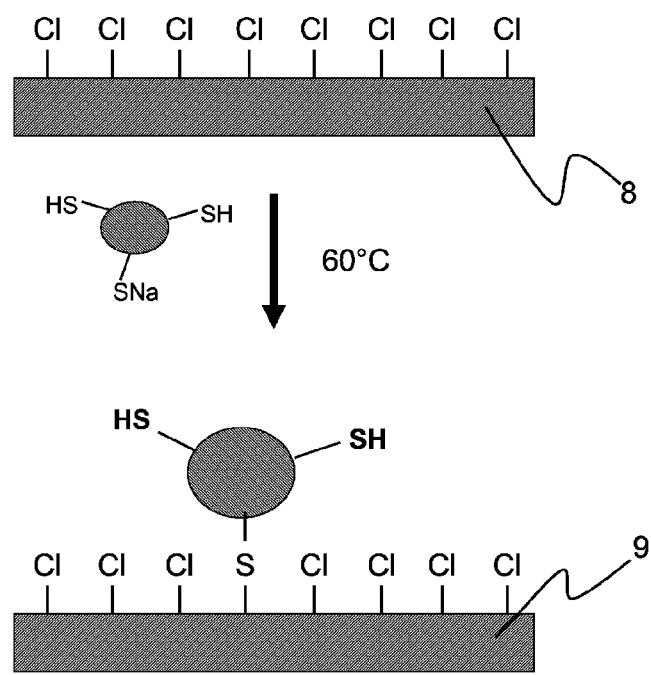

FIG. 4 is a schematical representation of a PVC substrate (8) being modified at 60° C. into a surface modified PVC substrate (9) using a thiol pigment having at least one of its thiol groups present as a sodium thiolate group.

Figure 2:
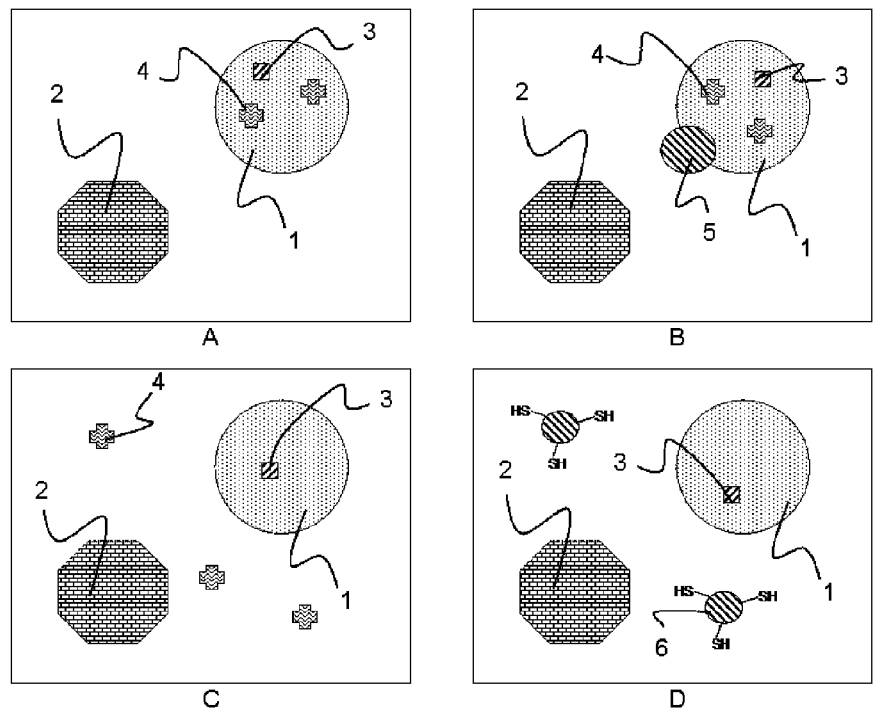
FIG. 2 shows schematical representations of preferred aqueous UV curable inkjet inks of the present invention wherein the polymeric particle (1) is a reactive composite particle.
Figure 3:
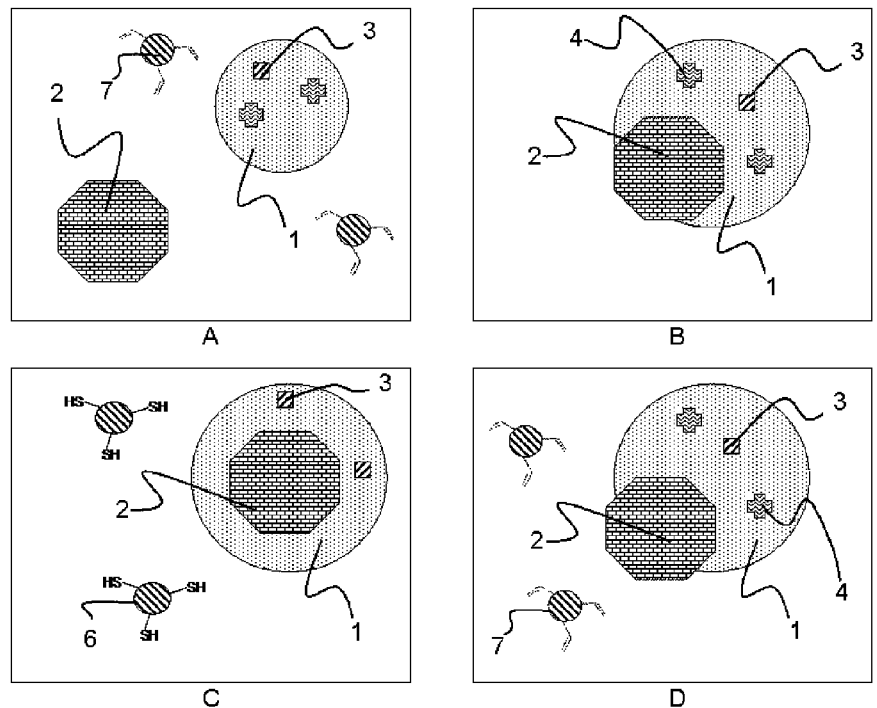
FIG. 3 shows schematical representations of preferred aqueous UV curable inkjet inks of the present invention wherein the polymeric particle (1) is a reactive composite particle.
Figure 5:
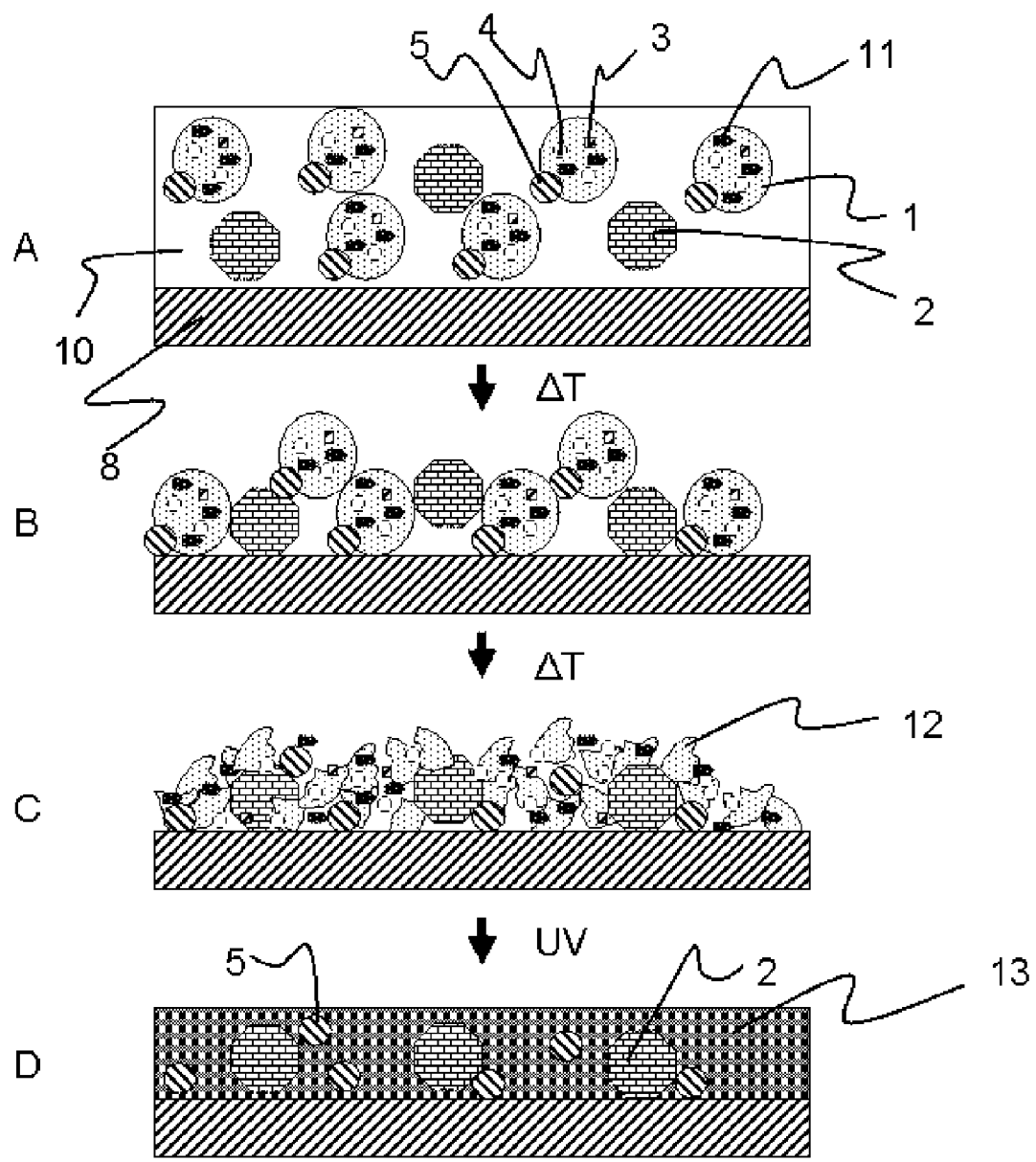

FIG. 5 is a schematical representation of a preferred inkjet printing method of the present invention. An aqueous UV curable inkjet ink according to FIG. 2.B, wherein the polymeric particles further contain polymerizable compounds (11), is jetted on a PVC substrate (8). By a thermal treatment, preferably involving infrared radiation, the aqueous medium (10) is removed in FIG. 5.B. By a further thermal treatment, the polymeric particles (11) decompose into reactive composite particle parts (12) while the photoinitiator (3), thiol molecules (4) and polymerizable compounds (11) are extracted. A polymeric network (13) is formed around the colorant (2) and the inorganic pigment (5) by UV curing the mixture of composite parts (12), photoinitiators (3), thiol molecules (4) and polymerizable compounds (11).

DETAILED DESCRIPTION OF THE PREFERRED EMBODIMENTS

Definitions

The term "monofunctional polymerizable compound" means that the polymerizable compound includes one polymerizable group.

The term "difunctional polymerizable compound" means that the polymerizable compound includes two polymerizable groups.

The term "polyfunctional polymerizable compound" means that the polymerizable compound includes more than two polymerizable groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group.

Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thio-ether, ketone, aldehyde, sulfoxide, sulfone, sulfonate ester, sulphonamide, —Cl, —Br, —I, —OH, —SH, —CN and —$NO_2$.

Aqueous UV Curable Inkjet Inks

An aqueous UV curable inkjet ink according to a preferred embodiment of the invention contains: a) an aqueous medium; b) a photoinitiator (3); c) a thiol compound (4,6) including at least two thiol groups; d) polymeric particles (1) containing a polymer, an oligomer or a monomer having ethylenically unsaturated polymerizable groups; and e) optionally a colorant (2).

In one embodiment, the polymeric particles (1) are latex particles. A latex is a stable dispersion of polymer particles in an aqueous medium. The latex may be a natural product, such as a natural rubber latex, or it may be a synthetic latex. The polymer constituting the latex particles preferably includes at least one monomeric unit selected from the group consisting of butadiene, chloroprene and isoprene. Such monomeric units allow for crosslinking of the polymer particles when UV curing the aqueous UV curable inkjet ink on a substrate.

In another embodiment, the aqueous UV curable inkjet ink includes polymeric particles (1) that are reactive composite particles. A composite particle is a solid mixture made of several different substances. The reactive composite particles used in the aqueous UV curable inkjet ink according to the present invention incorporate at least a polymer, an oligomer or a monomer having ethylenically unsaturated polymerizable groups. In a particularly preferred embodiment, the polymer incorporated in the reactive composite particles includes at least one monomeric unit selected from the group consisting of butadiene, chloroprene and isoprene. Such monomeric units allow for crosslinking of the polymer particles when UV curing the aqueous UV curable inkjet ink on a substrate.

For UV curing the aqueous UV curable inkjet ink, a photoinitiator is present in the aqueous UV curable inkjet ink. For enabling low migration properties and minimizing skin sensitivity of the jetted ink layer, the photoinitiator is preferably a polymeric or a polymerizable photoinitiator. In a more preferred embodiment, the photoinitiator is a polymerizable photoinitiator. In the most preferred embodiment, the photoinitiator is a polymerizable photoinitiator (3) charged on the surface of the latex particles or incorporated in the reactive composite particles.

For enhancing the low migration properties further, a thiol compound is present in the aqueous UV curable inkjet ink. The thiol compound may be present as an inorganic pigment, e.g. a silica pigment functionalised with thiol groups (6) and/or it may be present as a thiol molecule (4). The thiol molecule may be solubilised in the aqueous medium, but preferably it is charged on the surface of the surface of the latex particles or incorporated in the reactive composite particles.

The thiol compound is used to perform so-called thiolene and/or thiol-yne click chemistry. This chemistry is known to the skilled person as illustrated by e.g. KADE, Matthew J., et al. The Power of Thiol-ene Chemistry. (A) *J. polym. sci.*,

*A, Polym. chem.* 2010, vol. 48, p. 743-750. and YAO, BiCheng, et al. Thiol-yne click polymerization. *Chinese Science Bulletin*. August 2013, vol. 58, no. 22, p. 2711-2718.

The advantages of this chemistry that it insensitive to oxygen inhibition, which allows to obtain a high polymerization degree resulting in low migration properties. It was also observed that residual water remaining in the dried ink layer of the aqueous UV curable inkjet ink had no or minimal effect of the UV curing process of thiol-ene or thiol-yne chemistry.

Thiol-ene chemistry proceeds according to a step-growth mechanism which results in minimal shrinking. This effect is employed in the invention for enhancing adhesion to substrates, especially to non-absorbing substrates.

Furthermore on a PVC substrate it was found that a surface modification could be affected wherein the thiol compound was covalently bonded to the PVC surface, enhancing the adhesion even further as a non-bonded thiol group was available for reaction with a polymer, an oligomer or a monomer having ethylenically unsaturated polymerizable groups.

The aqueous UV curable inkjet ink preferably includes an inorganic pigment (5). The inclusion of an inorganic pigment makes the cured ink layer more scratch resistant. The inorganic pigment may be dispersed in the aqueous medium or may be fully or partially incorporated into the reactive composite particles. When an inorganic pigment is fully or partially incorporated into a reactive composite particle, it is also known as an organic-inorganic composite particle.

In addition to improving the scratch resistance, the inorganic pigment may also be allocated with a second function being the participation in the polymerization reaction during UV curing. For such a purpose, the surface of the inorganic pigment may be functionalized with thiol groups or ethylenically unsaturated polymerizable groups. An inorganic pigment functionalized with thiol groups is in this disclosure referred to as a thiol pigment, while an inorganic pigment functionalized with unsaturated polymerizable groups is referred to as a polymerizable pigment.

The aqueous UV curable inkjet ink may be a substantially colourless liquid. Such a colourless ink can be used as a primer, e.g. on a transparent substrate where an inkjet printed colour image is viewed through the transparent substrate. It may also be applied on top of the colour inkjet image as a protective layer or as a varnish to improve the glossiness.

The aqueous UV curable inkjet ink preferably includes a colorant, which may be a dye but is preferably a pigment. The colorant may be present in the aqueous medium, or if the aqueous UV curable inkjet ink includes reactive composite particles, it may be fully or partially incorporated into the reactive composite particles.

In a preferred embodiment, the aqueous UV curable inkjet ink is part of an aqueous UV curable inkjet ink set, more preferably part of an aqueous UV curable inkjet ink set including a plurality of inkjet inks according to the invention. The aqueous UV curable inkjet ink set preferably includes at least a cyan aqueous UV curable inkjet ink, a magenta or red aqueous UV curable inkjet ink, a yellow aqueous UV curable inkjet ink and a black aqueous UV curable inkjet ink.

The UV curable CMYK-inkjet ink set or CRYK-inkjet ink set may also be extended with extra inks such as green, blue, brown, violet and/or orange to further enlarge the colour gamut of the image. The UV curable inkjet ink set may also be extended by the combination of one or more full density inkjet inks with light density inkjet inks. The combination of dark and light colour inks and/or black and grey inks improves the image quality by a lowered graininess.

The UV curable ink set may also include one or more spot colours, preferably one or more corporate colours, such as e.g. the red colour of CocaCola™.

The curable inkjet ink set preferably also includes a white aqueous UV curable inkjet ink.

Alternatively a non-CMYK or non-CRYK UV curable ink set may be composed, for example, an UV curable inkjet inkset containing a white UV curable inkjet ink and/or a black UV curable inkjet ink in combination with a red spot colour UV curable inkjet ink, e.g. of CocaCola™.

The aqueous UV curable inkjet ink set is preferably a free radical aqueous UV curable inkjet ink set.

The viscosity of an aqueous UV curable inkjet ink used in the invention is preferably smaller than 43 mPa·s at 25° C. and at a shear rate of 90 $s^{-1}$, more preferably between 2 and 24 mPa·s at 25° C. and at a shear rate of 90 $s^{-1}$.

The surface tension of an inkjet ink used in the invention is preferably in the range of 17 mN/m to 40 mN/m at 25° C., more preferably in the range of 18 mN/m to 34 mN/m at 25° C. The inkjet ink may also contain at least one surfactant for obtaining good spreading characteristics on a substrate. An aqueous inkjet ink with a surface tension smaller than 17 mN/m at 25° C. usually has to include a high amount of surfactant, which may cause problems of foaming. A surface tension greater than 40 mN/m at 25° C. often leads to insufficient spreading of the ink on a plastic foil.

A preferred aqueous UV curable inkjet ink according to the present invention includes at least:
a) 25 to 80 wt % water;
b) 1 to 18 wt % a photoinitiator (3);
c) 1 to 18 wt % of a thiol compound (4,6) including at least two thiol groups;
d) 3 to 43 wt % of polymeric particles (1) containing a polymer, an oligomer or a monomer having ethylenically unsaturated polymerizable groups;
e) 0 to 18 wt % of a colour pigment (2);
f) 0 to 45 wt % of an organic solvent having a boiling point larger than water at 25° C. and 1 atm; and
g) 0 to 4 wt % of a surfactant;
wherein all weight percentages wt % are based on the total weight of the aqueous UV curable inkjet ink.

The aqueous UV curable inkjet ink preferably has a pH higher than 7.0, more preferably a pH in the range of 8.0 to 10.0.

Polymeric Particles

The polymeric particles (1) in the aqueous UV curable inkjet ink may be latex particles, reactive composite particles or the like.

The polymeric particles are preferably self-dispersing polymeric particles, meaning that functional groups are present on the surface of the polymeric particles for dispersing them in the aqueous medium of the aqueous UV curable inkjet ink. These functional groups are preferably selected from the group consisting of $-COO^-M^+$, $-SO_3^-M^+$, $-O-PO_3^-M^+$, $-O-SO_3^-M^+$, $-PO_3^-M^+$; wherein $M^+$ represents $H^+$ or a cation selected from the group consisting of $Na^+$, $Li^+$, $K^+$ and $NH_4^+$.

The polymeric particles preferably have an average particle size of no more than 5 μm, more preferably 10 nm to 1 μm, and most preferably 30 nm to 300 nm as determined by dynamic laser diffraction. For enhancing the transparency of the printed colours, the polymeric particles preferably have an average particle size smaller than 250 nm as determined by dynamic laser diffraction. Below 10 nm, food safety issues may arise when printing on some food packaging.

The nozzle diameter of inkjet print heads is preferably 18 to 35 μm. For reliable inkjet printing, the average particle size of the polymeric particles is about five times smaller than the nozzle diameter. An average particle size of no more than 5 μm allows jetting by print heads having the smallest nozzle diameter of 25 μm.

The aqueous UV curable inkjet ink preferably includes the polymeric particles in an amount of 3 to 43 wt %, more preferably 4 to 30 wt % and most preferably 8 to 20 wt %, wherein all weight percentages (wt %) are based on the total weight of the aqueous UV curable inkjet ink.

Latex Particles

The preparation of latex particles is well-known to the skilled person, and such latex particles are readily commercially available. Both latexes based on addition polymers, prepared by classical emulsion polymerisation, such as acrylate based latexes and latexes based on polycondensation polymers such as poly(urethane) and poly(ester) based latexes can be used. The latexes preferably contain ethylenically unsaturated groups or alkyne groups in the backbone or in the side chains. Particularly preferred latexes are butadiene or isoprene based polymers.

Particularly preferred latex particles are prepared from a copolymer includes styrene and butadiene as monomeric units, and preferably consists of styrene and butadiene as monomeric units. A commercially available styrene-butadiene latex is HPX393 from Styron Europe Gmbh.

A preferred manufacturing method of an aqueous UV curable inkjet ink according to the present invention includes the steps of: a) charging a (polymerizable) photoinitiator on to polymeric particles in an aqueous medium; and b) adding to the aqueous medium at least one component selected from the group consisting of a colorant, a surfactant, a pH adjuster and an organic solvent.

For charging a (polymerizable) photoinitiator onto polymeric particles, the (polymerizable) photoinitiator is first dissolved in a water-immiscible organic solvent having a boiling point of lower than 100° C. This solvent mixture is then finely dispersed in water or an aqueous medium, for example by a homogenizer, a microfluidizer or very high speed stirring in order to form an "oil-in-water" emulsion. This emulsion is then under stirring added to an aqueous medium containing dispersed polymeric particles. The organic solvent is distilled therefrom so that the (polymerizable) photoinitiator is transferred from the organic solvent phase to the surface of the polymeric particles as it becomes insoluble in the aqueous phase. Alternatively the (polymerizable) photoinitiator dissolved in a water-immiscible organic solvent having a boiling point of lower than 100° C. may also be directly added under high shear to the dispersion of polymeric particles.

Charging of polymerizable compounds and thiol molecules is performed in the same way, preferably simultaneously with a (polymerizable) photoinitiator is such compound is to be charged onto the latex particles.

Examples of an organic solvent having boiling point of lower than 100° C. include methyl ethyl ketone, ethyl ether, n-propyl ether, isopropyl ether, n-butyl methyl ether, tert-butyl methyl ether, n-butyl ethyl ether, tert-butyl ethyl ether, ethyl acetate, isopropyl acetate, and methyl propionate although they are non-limitative. In addition, each of them may be used solely or they may be used jointly by mixing them. Among those ones, ethyl acetate and methyl ethyl ketone are preferred as the organic solvent used for charging the (polymerizable) photoinitiator, polymerizable compounds and/or thiol molecules to the surface of the polymeric particles.

After distilling, other components may be added to complete or fine-tune the aqueous UV curable inkjet ink, such as a colorant or surfactant.

The latex preferably has a glass transition temperature (Tg) of no more than 70° C., more preferably no more than 50° C.

The minimum film-forming temperature (MFT) of the polymer latex is preferably between −50 and 70° C., more preferably between −40 and 50° C.

The average particle size of the latex particles in the inkjet ink is preferably less than 300 nm, more preferably less than 200 nm as measured by laser diffraction, e.g. using a Beckman Coulter™ LS 13320.

Reactive Composite Particles

In another embodiment, the aqueous UV curable inkjet ink includes polymeric particles (1) that are reactive composite particles. The polymer incorporated in the reactive composite particles includes at least one monomeric unit selected from the group consisting of butadiene, chloroprene, dicyclopentadiene, ethylene norbornene and isoprene. Typical polymers comprising a monomer unit selected from the group consisting of butadiene, chloroprene, dicyclopentadiene, ethylene norbornene and isoprene include EPDM rubbers, optionally carboxylated nitrile butadiene rubbers, isobutylene isoprene rubbers, ABS, polybutadienes, polyisoprenes and chloroprene rubbers.

In a preferred embodiment, the polymer is a liquid. Commercially available liquid polybutadienes are available as Lithene™ grades from SYNTHOMER. Particularly preferred polybutadienes have an average molecular weight Mn smaller than 10,000. A particularly preferred liquid polybutadiene is Lithene™ PM4 having an average molecular weight Mn of about 1,500.

In a preferred embodiment, the polymer used in the reactive composite particles is a maleinised polybutadiene. Preferred commercial examples of a maleinised polybutadiene include Lithene™ N4 5000 15MA, Lithene™ N4 B 10 MA and Lithene™ PM 4 7.5MA from SYNTHOMER. The maleinised polybutadiene preferably has an average molecular weight Mn smaller than 10,000 and preferably includes 5 to 20 wt % of maleic anhydride units based on the weight of the maleinised polybutadiene.

A preferred method for manufacturing a reactive composite suitable for the aqueous UV curable inkjet ink according to the invention includes the steps of:
a) making a composition including:
   a water immiscible solvent having a boiling point below 100° C. at normal pressure;
   a polymer including at least one monomeric unit selected from the group consisting of butadiene, chloroprene and isoprene;
   one or more selected from the group consisting of (polymeric or polymerizable) photoinitiators (3); thiol molecules (4); and monomers or oligomers having ethylenically unsaturated polymerizable groups; and
   optionally an inorganic pigment or colorant (2); and
b) mixing the composition with water; and
c) forming reactive composite particles in an aqueous medium by evaporating the water immiscible solvent. Esters, like ethyl acetate, are particularly preferred as water immiscible solvent.

A water immiscible solvent is an organic solvent having low miscibility in water. Low miscibility is defined as any water solvent combination forming a two phase system at 20° C. when mixed in a one over one volume ratio.

In a particularly preferred embodiment, the water immiscible solvent is ethyl acetate, because it has also a low flammability hazard compared to other organic solvents.

By including the one or more (polymeric or polymerizable) photoinitators (3) in the reactive composite particles, the properties of low migration are usually enhanced.

By including one or more thiol molecules (4) in the reactive composite particles, use can be me made of thiol-ene or thiol-yne click chemistry with its advantages. Preferably in such a case, the reactive composite particles, further contain also one or more oligomers or monomers having ethylenically unsaturated polymerizable groups. After the aqueous medium is removed, the polymeric particles break down or melt and the thiol compounds and/or the one or more oligomers or monomers having ethylenically unsaturated polymerizable groups flow out of the polymeric particle forming a layer which is UV cured into a polymeric network (13). This UV cured layer encapsulates the colour pigments and, if present, inorganic pigments. The polymer including at least one monomeric unit selected from the group consisting of butadiene, chloroprene and isoprene is incorporated in the polymeric network (13).

When the above described method for manufacturing reactive composite particles includes in step a) also an inorganic pigment, then the resulting reactive composite particle is generally one that incorporates fully or partially the inorganic pigment. Such reactive composite particles are known as organic-inorganic reactive composite particles.

For incorporating the colour pigment into the reactive composite particles, preferably first a dispersion is made of the colour pigment by using a polymeric dispersant dissolved in the water immiscible solvent, preferably dissolved in ethyl acetate.

Thiol Compounds

The thiol compound is advantageously used to execute thiol-ene and/or thiol-yne click chemistry. The thiol compound may be present as a thiol molecule (4) or as a thiol pigment (6), i.e. an inorganic pigment having its surface functionalized with thiol groups.

If the thiol compound is present as a thiol molecule, then it is preferably either charged on the surface of the latex particles or incorporated into the reactive composite particles, whatever the polymeric particles may be that are present in the aqueous UV curable inkjet ink.

A combination of thiol molecules (4) and thiol pigments (6) may also be used in the aqueous UV curable inkjet ink.

In a preferred embodiment, the thiol compound includes a thiol group which is converted to a thiolate group, such as a potassium thiolate group or a sodium thiolate group. Such a compound is capable of performing a surface modification of a PVC substrate as shown in FIG. 4 at a temperature of 60° C., which is a temperature obtainable in the inkjet printer during drying when using e.g. infrared light, such as a NIR-dryer or a CIR-dryer. The thiolate group may also be formed in-situ by adjustment of the pH of the aqueous UV curable inkjet ink. The chemical reaction that occurs on the PVC substrate is as follows:

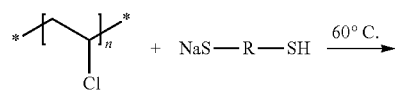

-continued

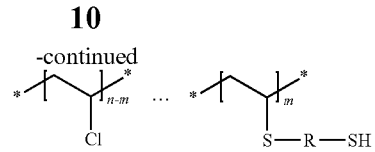

wherein R represents an optionally substituted alkylene group, an optionally substituted alkenylene group, an optionally substituted alkynylene group, an optionally substituted alkarylene group, an optionally substituted aralkylene group, an optionally substituted arylene or heteroarylene group, an ester containing aliphatic linking group, an ether containing aliphatic linking group and a silane containing aliphatic linking group or combinations thereof. The result is that a thiol compound covalently bonded to the PVC surface is available for reaction in a thiol-ene or a thiol-yne click chemistry.

The thiol compound may also be present as an oligomer or a polymer. Preferred thiol oligomers and polymers include urethanes, polyesters, polyethers, polycarbonates, poly-carbamates, polyureas and corresponding straight-chain oligomers.

In a preferred embodiment, the aqueous UV curable inkjet ink includes 0.1 to 25% by weight of the thiol compound, more preferably 0.5 to 20% by weight and most preferably 1 to 15% by weight all based on the total weight of the aqueous UV curable curable inkjet ink.

In a preferred embodiment, the aqueous UV curable inkjet ink includes thiol compounds and polymerizable compounds in an amount such that the ratio of "the number of thiol groups" over "the number of ethylenically unsaturated polymerizable groups and alkyne groups" is in the range of 0.25:1 to 4:1, preferably in the range of 0.5:1 to 2:1 and most preferably the ratio is about 1.

Thiol Molecules

The thiol molecule includes at least two thiol groups. Preferred thiol molecules include two to six thiol groups, preferably three to five thiol groups, and most preferably four thiol groups.

The thiol molecule is preferably a compound comprising an aliphatic thiol.

In a preferred embodiment, the thiol molecule is represented by Formula (I):

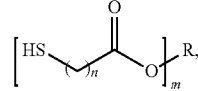

Formula (I)

wherein n represents an integer from 1 to 4; m represents an integer from 2 to 6; and R represents an m-valent linking group comprising at most 20 carbon atoms.

In a preferred embodiment n represents 1 or 2.

In a preferred embodiment m represents 3 or 4.

In a more preferred embodiment n represents 1 or 2 and m represents an integer from 2 to 6. In the most preferred embodiment n represents 1 or 2 and m represents 3 or 4.

In a preferred embodiment, the thiol compound has a molecular weight smaller than 1,000 Dalton, more preferably the thiol compound has a molecular weight smaller than 500 Dalton.

Particularly preferred primary thiol molecules include tetra(ethylene glycol) dithiol (CAS 2781-02-4), glykol di(3-mercaptopropionate) (CAS 22504-50-3), glyceryl dithioglycolate (CAS 63657-12-5), glycol dimercaptoacetate (CAS 123-81-9), trimethylolpropane trimercaptoacetate (CAS 10193-96-1), pentaerythritol tetramercaptoacetate (CAS 10193-99-4), glykol di(3-mercaptopropionate) (CAS 22504-50-3), trimethylolpropane tri(3-mercaptopropionate) (CAS 33007-83-9), pentaerythritol tetra(3-mercaptopropionate) (CAS 7575-23-7), dipentaerythritol hexa(3-mercaptopropionate) (CAS 25359-71-1), ethoxylated-trimethylolpropane tri-3-mercaptopropionate (CAS 345352-19-4), and tris[2-(3-mercaptopropionyloxy)ethyl]isocyanurate (CAS 36196-44-8).

The above and other thiol molecules are commercially available, e.g. as Thiocure™ grades from Bruno Bock Chemische Fabrik GmbH & Co. KG.

Suitable thiol molecules include 1,1,1-trimethylolpropane tris(3-mercaptopropyl)ether, 1,2,4-tris(2-mercaptoethyl)cyclohexane, tri(3-mercaptopropyl) trimetylolpropane and others disclosed by WO 2011/004255 A (KUROS BIOSURGERY).

It was found that thiol molecules having secondary thiol groups exhibited less odour than thiol molecules having only primary thiol groups. Hence, the thiol molecule preferably includes at least two secondary thiol groups, more preferably the thiol molecule includes two to six secondary thiol groups, preferably three to five secondary thiol groups, and most preferably four secondary thiol groups.

A particularly preferred thiol molecule having secondary thiol groups is pentaerythritol tetrakis (3-mercaptobutylate). The latter is available as Omnimer™ PE1 from IGM RESINS and Karenz MT™ PE1 from SHOWA DENKO.

For minimizing odour of an aqueous UV curable inkjet ink, especially after UV curing, the molar ratio of thiol molecules having primary thiol groups over thiol compounds having at least one secondary thiol group is preferably 0 to 4, more preferably the molar ratio is 0, meaning that the thiol molecules in the aqueous UV curable inkjet ink consist of thiol molecules containing at least one secondary thiol group. For calculating the molar ratio, a thiol molecule having primary thiol groups is considered to have only primary thiol groups, while thiol molecules containing at least one secondary thiol group may also include primary thiol groups.

In the most preferred embodiment, the thiol molecules consist of thiol molecules containing only secondary thiol groups.

For improving mechanical performance and limited potential for water uptake, leachables and degradation, the thiol molecules are preferably ester-free thiol molecules.

Particularly preferred ester-free thiol molecules are silane based thiol molecules and siloxane based thiol molecules. Such compounds can easily be synthesized by reacting thioacetic acid with functional alkenes to give thioester derivatives that can be hydrolyzed under alkaline or acidic conditions.

Suitable silane based thiol molecules and siloxane based thiol molecules are disclosed by WO 2011/004255 A (KUROS BIOSURGERY), especially those in the examples 1 to 6.

A preferred example of a silane based thiol molecule for use in the aqueous UV curable inkjet ink is tetra(3-mercaptopropyl)silane, which synthesis is described in Example 5 of WO 2011/004255 A (KUROS BIOSURGERY).

A preferred example of a siloxane based thiol molecule for use in the aqueous UV curable inkjet ink is 2,4,6,8-tetra(2-mercaptoethyl)-2,4,6,8-tetramethylcyclotetrasiloxane, which synthesis is described in Example 4 of WO 2011/004255 A (KUROS BIOSURGERY).

More preferably silane based thiol molecules and siloxane based thiol molecules including secondary thiol groups are used in the aqueous UV curable inkjet ink. Such thiol molecules not only improve mechanical properties, but also reduce the odour problem.

A preferred example of a silane based thiol molecule containing secondary thiol groups is the compound represented by the formula TH-1:

Formula TH-1

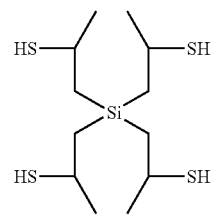

The synthesis of TH-1 may be performed in a multi-step reaction. In the first step, hydrogen bromide is reacted with tetraallylsilane to give tetrakis(2-bromopropyl)silane. The latter is converted with thiourea to its isothiouronium salt, which is then hydrolyzed with aqueous sodium hydroxide to give TH-1.

Thiol molecules that can dissolve in the aqueous medium of the UV curable inkjet ink often tend to migrate in the substrate and may cause food safety issues when printing on food packaging. Preferred thiol molecules have a water solubility at 20° C. of less than 10 g/l water, more preferably of less than 5 g/l water and most preferably of less than 1 g/l water.

Alternatively for obtaining low migration properties bulky thiol molecules may be used. Preferred bulky thiol molecules which may be included in the aqueous medium of the UV curable inkjet ink are so-called polyhedral oligomeric silsesquioxanes (POSS) represented by the following empirical formula $[R(SiO_{1.5})]_n$ (n=4,6,8, 10,12,14,16 and larger) that have specific cage structures such as represented in Table 1 by formulae POSS-1 to POSS-3 or partial cage structures such as represented by formula POSS-4. R1 to R12 represent hydrogen as well as inorganic or organic substituents, but at least two of the R1 to R12 groups include a thiol group, preferably a secondary thiol group.

TABLE 1

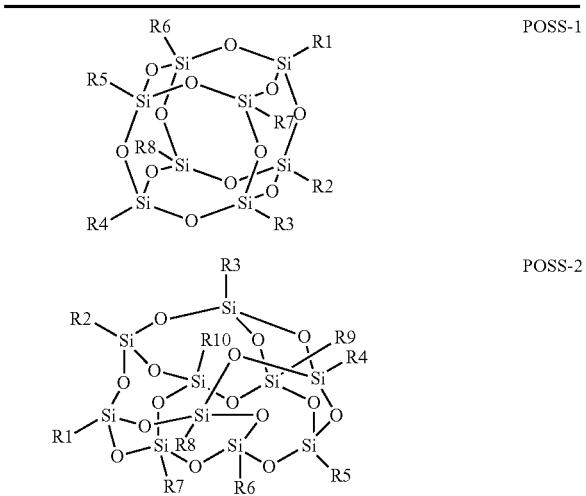

TABLE 1-continued

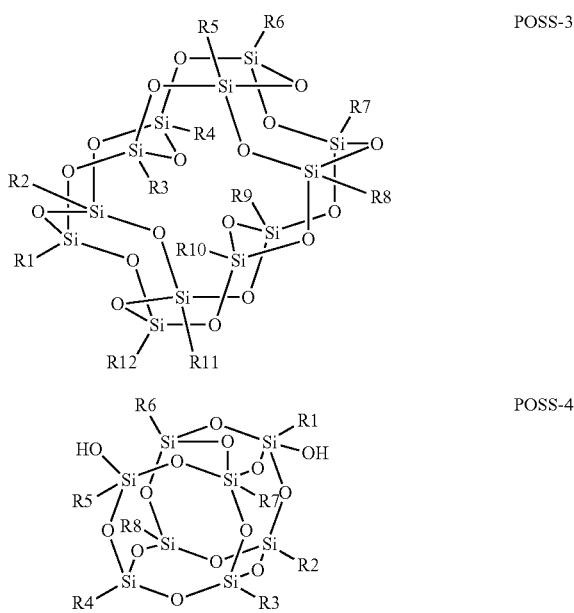

POSS-3

POSS-4

In the above thiol molecules POSS-1 to POSS-4, R1 to R12 each independently represent a hydrogen, an alkyl group, an alkenyl group, an alkynyl group, an aralkyl group, an alkaryl group and an aryl group, with the proviso that at least two of the R1 to R12 groups include a thiol group, preferably a secondary thiol group. The thiol group may be selected from an alkyl mercaptan group containing 1 to 6 carbon atoms and an aryl mercaptan, preferably a thiophenol.

A particularly preferred thiol molecule having a polyhedral oligomeric silsesquioxane structure is represented by POSS-5:

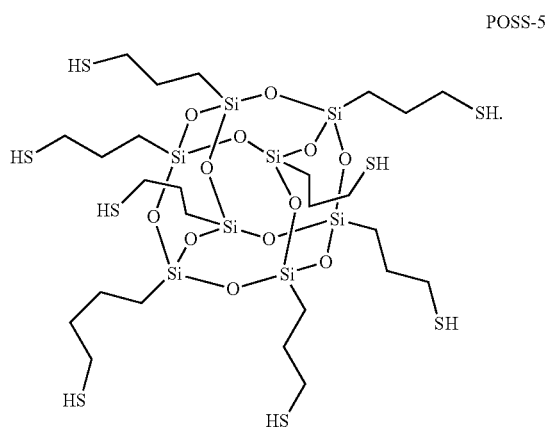 [SMILES: SCCCC[Si]12O[Si]3(CCCS)O[Si]4(CCCS)O[Si]5(CCCS)O[Si](CCCS)(O3)O[Si](CCCS)(O[Si](CCCS)(O5)O[Si](CCCS)(O4)O1)O2]

POSS-5

The structures and synthesis of silsesquioxanes have been discussed in more detail by R. Baney et al. in Chemical Review, 1995, 95, 1409-1430 as well as in the references cited therein and by Guizhi Li et al. in Journal of Inorganic and Organometallic Polymers, Vol. 11 (3), September 2001, page 123-154 as well as in the references cited therein. Silsesquioxanes with specific cage structures have been designated as polyhedral oligomeric silsesquioxanes, POSS. Such cage structures are described in Journal of Inorganic and Organometallic Polymers, Vol. 11 (3), September 2001, page 124, Scheme 1 (structures c-f).

An important benefit of polyhedral oligomeric silsesquioxanes is that it affords the material formulations with excellent thermal, mechanical and oxidative stability, as well as flammability resistance. This is largely due to the inorganic core of the POSS molecules.

Silsesquioxanes (POSS) containing thiol groups cab be obtained from companies such as Hybrid Plastics, Fountain Valley, Calif. 92708-6117, USA.

Thiol Pigments

The thiol compound may also be a so-called thiol pigment (6). A thiol pigment is an inorganic pigment, such as a silica pigment or a titaniumdioxide pigment, which surface has been functionalized with two or more thiol groups.

Silica nanoparticles are preferred because they are usually small-sized, monodisperse and can be easily surface-modified. A monodisperse distribution is advantageous for the transparency of printed colour inks, thus enlarging the colour gamut.

Thiol groups are preferably introduced on the surface using an alkoxysilane containing a thiol group. Typical examples of siloxanes containing a thiol are 3-mercapotopropyl triethoxysilane, 3-mercaptopropyl trimethoxysilane, 2-mercaptoethyl triethoxysilane, 4-mercaptobutyl triethoxysilane, 2-mercaptopropyl trimethoxysilane and 3-mercaptobutyl trimethoxysilane. A preferred alkoxysilane containing a thiol group is 3-mercaptopropyl trimethoxysilane (MPTMS).

An example of a suitable synthesis scheme for a thiol pigment is as follows: a dry phase deposition method was used to functionalize silica particles (e.g. Ludox™ TM-50 from GRACE having an average particle size of about 22 nm). The silica particles were dispersed in anhydrous ethanol (15 mL of ethanol per gram of silica) and MPTMS (available from ALDRICH) was added such that the ratio of the amount of silica (in g) to the amount of MPTMS (in mL) was 3:7. Ultra high purity grade nitrogen was bubbled through the mixture to evaporate the ethanol under fume hood, thus depositing MPTMS on the surface of the silica. For the silanization reaction, the silica was then placed in oven at 120° C. for 9 hours. The material was allowed to cool and washed twice with 50 mL of anhydrous ethanol to remove any physically adsorbed MPTMS and dried again in oven. The silica was analyzed using FTIR to verify the MPTMS deposition on the silica surface.

The number of thiol groups on the thiol pigment surface can be easily modified as desired as long as at least two thiol groups are present. However, usually a large number of thiol groups is present on the pigment surface, preferably more than ten thiol groups, more preferably even more than twenty or fifty thiol groups.

A commercially available thiol pigment having an average particle size of 2.2 μm is Aktisil™ MM mercapto modified from HOFMANN MINERAL.

The average particle size of the thiol pigment as measured according to ISO 13320-1 is preferably between 10 nm and 2.5 μm, more preferably between 15 nm and 250 nm, and most preferably between 20 nm and 150 nm.

If an inorganic pigment is used as thiol pigment, an improved scratch resistance and reduced tackiness of the ink layer is observed.

Due to its higher molecular weight per unit, it is not necessary to include secondary thiol groups for improvement of the odour. In fact preferably primary thiol groups are included because of their greater reactivity in thiol-ene and thiol-yne click chemistry.

Photoinitiators and Co-Initiators

One or more photoinitiators may be included in the aqueous UV curable inkjet ink of the invention. They may be dissolved or dispersed in the aqueous medium of the aqueous UV curable inkjet ink, but preferably they are charged onto the surface of the latex particles or incorporated into the reactive composite particles.

The photoinitiator is preferably a Norrish Type I or II photoinitiator. If the the aqueous UV curable inkjet ink includes (also) one or more cationically curable compounds, then the photoinitiator may (also) be a cationic photoinitiator. However, the photoinitiator or photoinitiating system preferably consists of one or more free radical initiator, optionally completed by co-initiators or polymerization synergists.

Two types of free radical photoinitiators can be distinguished and used in the inkjet inks of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4,4-trimethylpentylphosphine oxide, 2,4,6-trimethylbenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

For certain applications such as food packaging, the photoinitiator is preferably a so-called diffusion hindered photoinitiator. A diffusion hindered photoinitiator is a photoinitiator which exhibits a much lower mobility in a cured layer of the aqueous UV curable inkjet ink than a monofunctional photoinitiator, such as benzophenone. Several methods can be used to lower the mobility of the photoinitiator. One way is to increase the molecular weight of the photoinitiator so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators. The diffusion hindered photoinitiator is preferably selected from the group consisting of multifunctional photoinitiators, oligomeric photoinitiators, polymeric photoinitiators and polymerizable photoinitiators. Most preferably the diffusion hindered photoinitiator is a polymerizable initiator or a polymeric photoinitiator.

Suitable diffusion hindered photoinitiators are also those disclosed in EP 2053101 A (AGFA) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2065362 A (AGFA) and EP 2161264 A (AGFA), incorporated herein by reference.

If the aqueous UV curable contains one or more cationically radical curable compounds, then it contains at least one cationic photoinitiator. A cationic photoinitiator is a compound that generates acid and initiates cationic polymerization upon irradiation by UV light. Any known cationic photoinitiator may be used. The cationic photoinitiator may be used alone as a single initiator or as a mixture of two or more initiators.

Suitable photocationic polymerization initiators include diazonium salts, phosphonium salts, sulfonium salts, iodonium salts, imide sulfonates, oxime sulfonates, diazo disulfones, disulfones, and o-nitrobenzyl sulfonates. Examples of these cationic photoinitiators are described in US 2006222832 A (FUJI), US 3779778 (3M) and US 2008055379 A (KONICA).

In order to increase the photosensitivity further, the free radical curable inkjet ink may additionally contain co-initiators. Suitable examples of co-initiators can be categorized in three groups:

(1) tertiary aliphatic amines such as methyldiethanolamine, dimethylethanolamine, triethanolamine, triethylamine and N-methylmorpholine;

(2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate; and (3) (meth)acrylated amines such as dialkylamino alkyl (meth)acrylates (e.g., diethylaminoethylacrylate) or N-morpholinoalkyl-(meth)acrylates (e.g., N-morpholinoethylacrylate).

The preferred co-initiators are aminobenzoates.

The one or more co-initiators included into the aqueous UV curable inkjet ink are preferably diffusion hindered co-initiators for safety reasons. A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators.

For applications such a textiles where skin sensitization and skin irritation is to be avoided, preferably polymerizable photoinitiators are used that include one or more polymerizable groups differing from (meth)acrylate groups. Preferred polymerizable photoinitators include an alkynyl group and/or a vinylcarbonate group as polymerizable group. Preferred polymerizable photoinitiators are those disclosed in WO 2015/031927 (DURST), especially those disclosed in Tables 1 to 5.

Particularly preferred are photoinitiators including an alkynyl group and/or a vinylcarbonate group as polymerizable group and including a thioxanthone group or an acylphosphine oxide group, as these polymerizable photoinitiators allow for UV curing by UV LEDs, having a wavelength larger than 370 nm. Preferred polymerizable thioxanthone photoinitiators include the examples 21, 22, 23, 24, 25, 26 and 27 in Table 1; the examples 42, 43 and 53 in Table 2; the example 56 in Table 3; and the example 77, 78, 79, 80, 81 and 82 in Table 4 of WO 2015/031927 (DURST).

Preferred polymerizable acylphosphine oxide photoinitiators include the examples 97, 98, 99, 100, 101, 102, 103, 104, 105, 106, 107, 108, 109, 110, 111, 112, 114 disclosed in WO 2015/031927 (DURST).

For preventing bad odour, the most preferred acylphosphine oxide photoinitiators are those having a polymerizable group on each mesitaldehyde group of the acylphosphine oxide photoinitiator.

Particularly preferred acylphosphine oxide photoinitiators are the compounds 108, 109, 110, 111, 112, 113 and 114 disclosed in WO 2015/031927 (DURST).

A preferred amount of the one or more free radical and/or cationic photoinitiators is 0.1-30 wt %, more preferably 0.3-20 wt %, and most preferably 0.5-15 wt % of the total weight of the aqueous UV curable inkjet ink.

The aqueous UV curable inkjet ink preferably comprises a co-initiator in an amount of 0.1 to 50 wt %, more preferably in an amount of 0.5 to 25 wt %, most preferably in an amount of 1 to 10 wt % of the total weight of the aqueous UV curable inkjet ink.

Polymerizable Compounds

Any polymerizable compound commonly known in the art may be employed, but for certain applications preferably no acrylates or methacrylates are employed. A combination of monomers, oligomers and polymers may be used. The monomers, oligomers and polymers may possess different degrees of functionality, and a mixture including combinations of mono-, di-, tri- and higher functionality monomers, oligomers and/or polymers may be used.

For certain applications, such as food packaging applications, the amount of monofunctional monomers, oligomers and/or polymers is preferably no more than 0 to 10 wt % based on the total weight of polymerizable compounds.

Suitable monomers and oligomers are preferably selected from a group comprising or consisting of acrylates, methacrylates, vinyls, acrylamides, methacrylamides, vinyl carbonates, vinyl ethers, vinyl esters, vinyl carbamates, allyl ethers, allyl esters and their corresponding alkyne compounds. More preferably the monomers and oligomers are selected from a group comprising or consisting of vinyls, acrylamides, methacrylamides, vinyl carbonates, vinyl ethers, vinyl esters, vinyl carbamates, allyl ethers, allyl esters and their corresponding alkyne compounds. Particularly preferred are polymerizable compounds including allyl ether groups, vinyl carbonate groups and alkyne groups.

Synthesis of such monomers is disclosed in the relevant literature, for example in HURD, Charles D. Vinylation and the Formation of Acylals. *Journal Am. Chem. Soc.* 1956, vol. 78, no. 1, p. 104_106.; LOBELL, M., et al. Synthesis of hydroxycarboxylic acid vinyl esters. *MP Synthesis.* 1994, vol. 4, p. 375-377.; LEE, T. Y., et al. Synthesis, Initiation, and Polymerization of Photoinitiating Monomer. *Macromolecules.* 2005, vol. 38, no. 18, p. 7529-7531.; ATTA, A. M., et al. New vinyl ester resins based on rosin for coating applications. *React. Funct. Polym.* 2006, vol. 66, p. 1596-1608. WO 01/00634 A (WRIGHT CHEM CORP); and ROHR, Markus, et al. Solvent-free ruthenium-catalysed vinylcarbamate synthesis from phenylacetylene and diethylamine in 'supercritical' carbon dioxide. *Green Chemistry.* 2001, vol. 3, p. 123-125.

Preferred compounds for the synthesis of the above functional monomer include ethylene glycols; propylene glycols; neopentylglycols; 1,1'-methylene-di (2-naphthol); 1,1,1-tris (4-hydroxyphenyl) ethane; 1,14-tetradecanediol; 1,2,4-benzenetriol; 1,2-benzenedimethanol; 1,2-decanediol; 1,2-pentanediol; 1,2-tetradecanediol; 1,3-dioxane-5,5-dimethanol; 1,3-propanediol; 1,4-bis (2-hydroxyisopropyl) benzene; 1,5-hexadiene-3,4-diol; 1,6-dihydroxy naphthalene; 1,6-hexane diol; 1-(2-nitrophenyl)-1,2-ethanediol; 1-(benzyloxymethyl) tri (ethylene glycol); 1-[N,N-bis (2-hydroxyethyl)amino]-2-propanol; 2,2'-(o-phenylenedioxy) diethanol; 2,2' biphenyldimethanol; 2,2'-bipyridine-3,3'-diol; 2,2, 3,3,4,4,5, 5-octafluoro-1,6-hexanediol; 2,2,4-trimethyl-1,3-pentanediol; 2,2-bis (bromomethyl)-1,3 propanediol; 2,2-bis (hydroxymethyl) butyric acid; 2,3,5,6-tetramethyl-p-xylene-a,a'-diol; 2,3-dibromo-1,4-butanediol; 2,3-dichloro-5,8-dihydroxy-1,4-naphthoquinone; 2,4-dimethyl-2,4-pentanediol; 2,5-dibromohydroquinone; 2,5-dihydroxy-1,4-benzoquinone; 2,5-dimethylresorcinol; 2,6-dihydroxy-4-methyl-3-pyridinecarbonitrile; 2,7-dimethyl-3,5-octadiyne-2,7-diol; 2-(bromomethyl)-2-(hydroxymethyl)-1,3-propanediol; 2-benzyloxy-1,3-propanediol; 2-hydroxyethyl disulfide; 2-hydroxymethyl-1,3-propanediol; 2-methyl-1,3-propanediol; 2-methylene-1,3-propanediol; 2-nitroresorcinol; 2-phenyl-1,2-propanediol; 3',5'-dihydroxyacetophenone; 3,3'-(ethylenedioxy) diphenol; 3,3,3',3'-tetramethyl-1, 1'-spirobiindane-5,5',6,6'-tetraol; 3,3-dimethyl-1,2-butanediol, 3-(4-methoxyphenoxy)-1,2-propanediol; 3-bromo-1,2-propanediol; 3-cyclohexene-1,1-dimethanol; 3-ethoxy-1,2-propanediol; 3-fluorocatechol; 3-hexyne-2,5-diol; 3-methoxy-1,2-propanediol; 3-methyl-1,3,5-pentanetriol; 3-morpholino-1,2-propanediol; 3-phenoxy-1,2-propanediol; 3-piperidin-1,2-propanediol; 4,4'-dihydroxybenzophenone; 4,4'-isopropylidene-bis[2-(2,6-dibromophenoxy) ethanol]; 4,4'-isopropylidenedicyclohexanol; 4,6-dinitropyrogallol; 4-amino-4-(3-hydroxypropyl)-1,7-heptanediol; 4-bromo-3, 5-dihydroxybenzoic acid; 4-tert-butylcalix[4]arene; 5-chloro-2,3-pyridinediol; 7,8-dihydroxy-6-methoxycoumarin; 7-octene-1,2-diol, anthrarufin; bis (2-hydroxyethyl) terephthalate; chlorohydroquinon; di(trimethylolpropane), diethyl 2,5-dihydroxyterephthalate; diethyl bis (hydroxymethyl) malonate; hydrobenzoin; hydroquinone-bis (2-hydroxyethyl) ether; methyl 3,4,5-trihydroxybenzoate; N,N,N', N'-tetrakis (2-hydroxypropyl) ethylenediamine; nitromethantrispropanol; pentaerythritol; tetrafluorohydroquinone; triisopropanolamine; 1,3,5-cyclohexanetriol; 1, 2-cyclopentanediol; tert-butylhydroquinone; 1,2-cyclohexanediol; 1,4-dioxane-2,3-diol; 2.3-dibromo-2-butene-1, 4-diol; trans-p-menth-6-ene-2,8-diol; 2,2'-biphenol, 3,3',5, 5'-tetrabromobisphenol A; 4,4'-(1,3-phenylenediisopropylidene) bisphenol; 4,4'-(1,4-phenylene diisopropylidene) bisphenol; 4,4'-(1-phenylethylidene) bisphenol; 4,4'-(9-fluorenylidene) diphenol; 4,4'-(hexafluoroisopropylidene) diphenol; 4,4'-cyclohexylidene bisphenol; 4,4'-ethylidenebisphenol; 4,4'-isopropylidenebis (2,6-dimethylphenol); 4,4'-dihydroxybiphenyl; 4,4'-methylenebis (2,6-di-tert-butylphenol); 4,4'-sulfonylbis (2-methylphenol); 4,4'-sulfonyldiphenol; 4,4'-thiodiphenol; bis[4-(2-hydroxyethoxy) phenyl] sulfone; bisphenol A; ethoxylated bisphenol A; propoxylated bisphenol A; bisphenol C; 1,2,4,5 benzentetracarboxamide; 1,2-diaminocyclohexane; 1,3-cyclohexanebis(methylamine); 1,4-diaminoanthraquinone; 1,5-diamino-2-methylpentane; 1,9-diaminononane; 2,2'-(ethylenedioxy) bis(ethylamine); 2,2-dimethyl-1,3-propanediamine; 2,3,5,6-tetramethyl-p-phenylenediamine; 2,4,6-trimethyl-m-phenylenediamine; 2,4,8,10-tetraoxaspiro [5.5] undecane 3,9-dipropanamine; 2,4-diaminotoluene; 2,5-dichloro-p-phenylenediamine; 2,5-dimethyl-1,4-phenylenediamine; 2,6-diaminopurine; 2,6-diaminotoluene; 2-aminophenyl disulfide; 3,3'-methylenedianiline; 3,4'-oxydianiline; 3,4-diaminobenzophenone; 4,4'-(1,1'-biphenyl-4,4'-diyldioxy) dianiline; 4,4'-(1,3-phenylenediisopropylidene) bisaniline; 4,4'(1,3-phenylenedioxy) dianiline; 4,4'-(1,4-phenylenediisopropylidene) bisaniline; 4,4'-(4,4'-isopropylidene dendiphenyl-1,1'-diyldioxy)dianiline; 4,4'-(hexafluoroisopropylidene) bis (p-phenylene-oxy) dianiline; 4,4'-(hexafluoroisopropylidene) dianiline; 4,4'-diaminobenzophenone; 4,4'-diaminooctafluorobiphenyl; 4,4'-methylenebis(cyclohexylamine); 4,4'-diaminobenzanilide; 4,4'-methylene-bis (2-chloroaniline); 4,4'-methylenebis (2,6-diethylaniline); 4,4'-methylenebis (2,6-dimethylaniline); 4,7,10-trioxa-1,13-tridecanediamine; 4,9-dioxa-1,12-dodecanediamine; 4-aminophenyl, 4-chloro-o-phenylenediamine; 5,5'-(hexafluoroisopropylidene) di-o-toluidine; 6-chloro-3,5-diamino-2-pyrazinecarboxamide; DYTEK®-EP-diamine; poly(1,4-butanediol) bis (4-aminobenzoate); tris (2-aminoethyl) amine; p-xylylenediamine; 1,4,8,11-tetraazacy-5,7-dione; 1,4,8,12-tetraazacyclopentadecane; 1,5,9 triazacyclododecane; N,N'-diisopropyl-1,3-propanediamine; N,N'-diisopropylethylenediamine; N,N'-diphenyl-p-phenylenediamine; N,N'-diethyl-2-butene-1,4-diamine; N,N'-dimethyl-1,3-propanediamine; 1-[bis[3-(dimethylamino)propyl]amino]-2-propanol; 2-[2-(dimethylamino) ethoxy] ethanol; 1,1-cyclohexanediacetic acid, 1,2,3,4-butane tetracarboxylic acid; 1,2,3-triazole-4,5-dicarboxylic acid; 1,3,5-cyclohexanetricarboxylic; 1,3 acetonedicarboxylic; 1,3-adamantanediacetic acid; 1,3-cyclohexane dicarboxylic acid; 1,4-naphthalene dicarboxylic acid; 1,4-phenylenedipropionic, 2,2'-bipyridine-4,4 '-dicarboxylic acid; 2,2'-Iminodibenzoesäure, 2,3-dibrombutandicarboxylic acid; 2,5-dihydroxyterephthalic acid, 2,6-dimethyl-3,5-pyridinedicarboxylic acid; 2,6-naphthalene dicarboxylic acid; 2-(2-methoxyethoxy) acetic acid, 2-bromoterephthalic acid; 2-methoxyisophthalic acid; 2-[2-(2-methoxyethoxy) ethoxy] acetic acid; 3-fluorophthalic acid; 3-phenylglutaric acid; 3-thiophenmalonic acid; 4,4'-oxybis (benzoic acid), 4,4' sulfonyldibenzoic acid, 4,5-dichlorophthalic acid; 4-methylphthalic acid; 5-(octadecyloxy) isophthalic acid; 5-tert butylisophthalic acid; 6-methyl-2,3-dicarboxylic acid; 1,7-heptanedicarboxylic acid; benzyl malonic acid; biphenyl-4,4'-dicarboxylic acid; bis (carboxymethyl) trithiocarbonate; butylmalonic acid; chlorobutandiacid; cyclohexylbutandiacid; dibromomaleinic acid; diethylmalonic acid; dodecandiacid; ethylmalonic acid; hexadecanediacid; 2-methyl-2-butenediacid; perfluoroglutaric acid; phenylmalonic acid; terephthalic acid; tetrafluorophthalic acid; undecanediacid, p-terphenyl 4,4"dicarboxylic acid; 1,6-hexanediacid; etc. can be used.

These polymerizable compounds are preferably charged onto latex particles or incorporated into reactive composite particles.

Preferred polymerizable oligomers and polymers are urethanes, polyesters, polyethers, polycarbonates, poly-carbamates, polyureas and straight-chain oligomers having the following polymerizable groups: acrylate, methacrylate, vinyl, acrylamide, methacrylamide, vinyl carbonate, vinyl ether, vinylester-vinyl carbamate groups, as well as their corresponding alkyne compounds.

Particularly preferred monomers are selected from the group consisting of di- or oligofunctional allylethers, di- or oligofunctional allyl esters, di- or oligofunctional vinyl ethers, di- or oligofunctional vinyl esters and di- or oligofunctional norbornene derivatives. Typical allyl ethers can be selected from pentaerythritol tetraallyl ether, glycerol triallyl ether, 1,6-hexane diol diallyl ether, cyclohexane dimethanol diallyl ether, trimethylolpropane triallyl ether, dipentaerythritol hexaallyl ether and ethoxylated and propoxylated derivatives thereof. Typical vinylethers can be selected from pentaerythritol tetravinyl ether, glycerol trivinyl ether, 1,6-hexane diol divinyl ether, cyclohexane dimethanol divinyl ether, trimethylolpropane trivinyl ether, dipentaerythritol hexavinyl ether and ethoxylated and propoxylated derivatives thereof. Typical allyl esters can be selected from adipic acid diallyl ester, terephtalic acid diallyl ester, trimellitic acid triallyl ester, pyromellitic acid tetraallyl ester, citric acid triallyl ester and glutaric acid diallyl ester. Typical vinyl esters can be selected from adipic acid divinyl ester, terephtalic acid divinyl ester, trimellitic acid trivinyl ester, pyromellitic acid tetravinyl ester, citric acid trivinyl ester and glutaric acid divinyl ester.

Thiol-yne chemistry has been described as an extension for thiol-ene chemistry to design crosslinked networks with a higher crosslinking density and glass transition temperature in comparison with thiol-ene based networks. The chemistry has recently been reviewed by Lowe et al. (Journal of Materials Chemistry, 20, 4745-4750 (2010)) and by Hoogenboom R. (Angew. Chem. Int. Ed. 49, 3415-3417 (2010)).

Optionally photochemically induced radical double addition of polyfunctional thiol compounds to di- or multifunctional alkynes is the basis of thiol-yne chemistry. In principle any di- or multifunctional alkyne, including polymeric alkynes, can be used in combination with any di- or polyfunctional thiol compound.

In a preferred embodiment, at least one of the alkyne functions in the di- or polyfunctional alkynes is represented by H—C≡C—*, where represents the covalent bond to the rest of the di- or polyfunctional alkyne.

In a more preferred embodiment, all of the alkyne groups in the di- or polyfunctional alkyne are represented by H—C≡C—*.

In an even more preferred embodiment, the alkyne functions in said di- or polyfunctional alkyne is selected from the group consisting of a propargyl ether, a propargyl ester, a propargyl urethane, a propargyl ureum, a propargyl carbonate, a propargyl amide, a propargyl thioether and a propargyl amine. In a further preferred embodiment, said alkyne group is selected from the group consisting of a propargyl ether, a propargyl ester and propargyl urethane, a propargyl ester and a propargyl urethane being particularly preferred.

Typical examples of di- and polyfunctional alkynes are given by Table 2 without being limited thereto.

TABLE 2

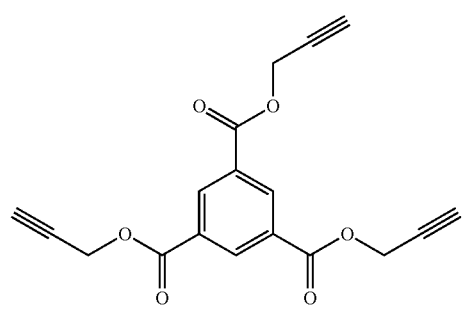 [SMILES: C#CCOC(=O)c1cc(C(=O)OCC#C)cc(C(=O)OCC#C)c1]

Alkyne-1

TABLE 2-continued
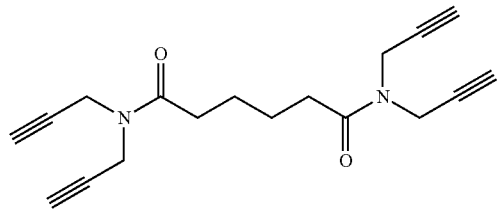 [SMILES: C#CCN(CC#C)C(=O)CCCCC(=O)N(CC#C)CC#C]
Alkyne-2
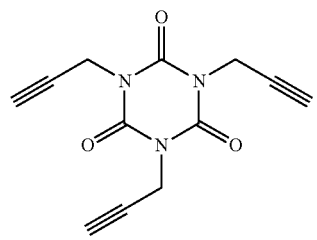 [SMILES: C#CCn1c(=O)n(CC#C)c(=O)n(CC#C)c1=O]
Alkyne-3
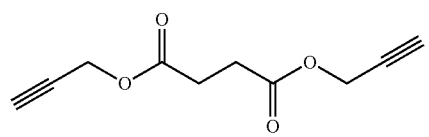
Alkyne-4
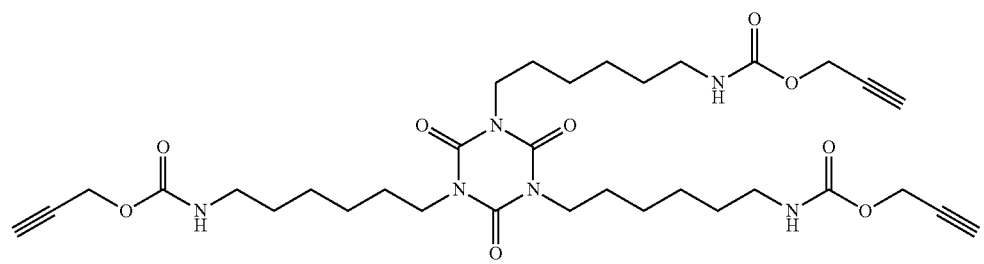 [SMILES: C#CCOC(=O)NCCCCCCn1c(=O)n(CCCCCCNC(=O)OCC#C)c(=O)n(CCCCCCNC(=O)OCC#C)c1=O]
Alkyne-5
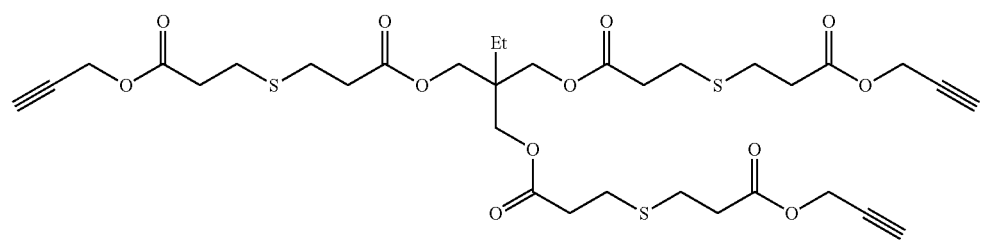 [SMILES: C#CCOC(=O)CCSCCC(=O)OCC(CC)(COC(=O)CCSCCC(=O)OCC#C)COC(=O)CCSCCC(=O)OCC#C]
Alkyne-6
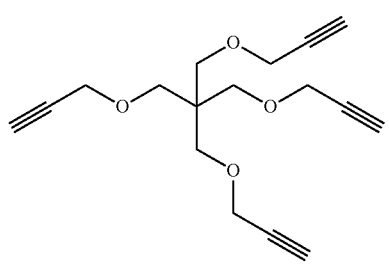 [SMILES: C#CCOCC(COCC#C)(COCC#C)COCC#C]
Alkyne-7
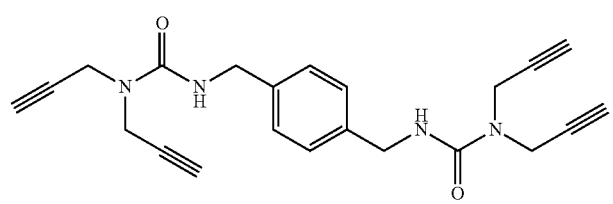 [SMILES: C#CCN(CC#C)C(=O)NCc1ccc(CNC(=O)N(CC#C)CC#C)cc1]
Alkyne-8

TABLE 2-continued
| | |
|---|---|
| 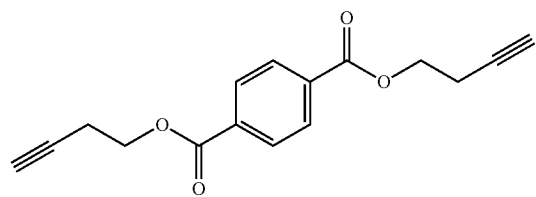 [SMILES: C#CCCOC(=O)c1ccc(C(=O)OCCC#C)cc1] | Alkyne-9 |
|  | Alkyne-10 |
| 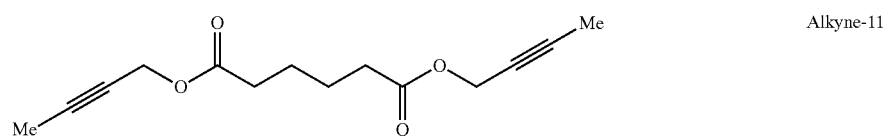 | Alkyne-11 |
| 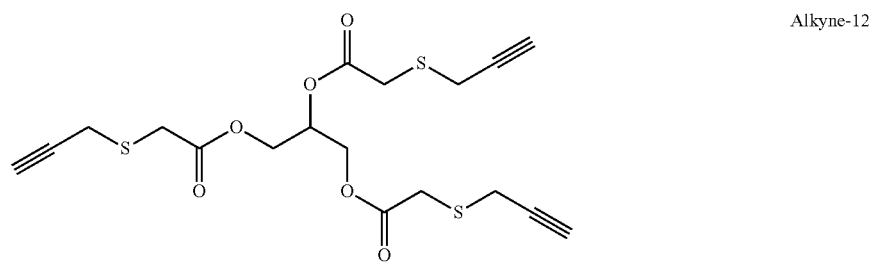 | Alkyne-12 |
| 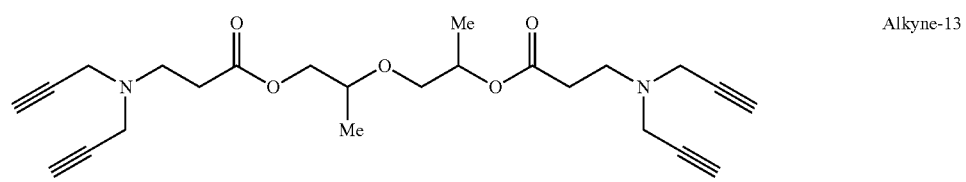 | Alkyne-13 |
|  | Alkyne-14 |
|  | Alkyne-15 |

In a preferred embodiment, the aqueous UV curable inkjet ink includes 0.5 to 30% by weight of polymerizable compounds, more preferably 0.1 to 20% by weight and most preferably 1 to 25% by weight all based on the total weight of the aqueous UV curable curable inkjet ink.

Polymerizable Pigments

A polymerizable pigment is a pigment, preferably an inorganic pigment, such as a silica pigment or a titaniumdioxide pigment, which surface has been functionalized with ethylenically unsaturated polymerizable groups.

Silica nanoparticles are preferred because they are usually small-sized, monodisperse and can be easily surface-modified. A monodisperse distribution is advantageous for the transparency of printed colour inks, thus enlarging the colour gamut.

Ethylenically unsaturated polymerizable groups and alkyne groups can be introduced on the surface using a alkoxysilane containing an ethylenically unsaturated polymerizable group or an alkyne group, using synthesis methods similar to those described for the thiol pigment above. Typical alkoxysilanes containing an ethylenically unsaturated group or an alkyne group can be selected from the group consisting of trimethoxy-2-propen-1-yl-silane, 1-ethenyl-4-(trimethoxysilyl)-benzene, trimethoxy-7-octen-1-yl-silane, trimethoxy-5-hexen-1-yl-silane, [3-(ethenyloxy)propyl] trimethoxysilane, trimethoxy-[3-(2-propen-lyloxy) propyl] silane and vinyltriethoxysilane (VTES). A particularly preferred silane containing an ethylenically unsaturated polymerizable group is vinyltriethoxysilane (VTES).

The number of polymerizable groups on the polymerizable pigment surface can be easily modified as desired as long as at least two polymerizable groups are present. However, usually a large number of polymerizable groups is present on the pigment surface, preferably more than ten polymerizable groups, more preferably even more than twenty or fifty polymerizable groups.

A commercially available polymerizable pigment having an average particle size of 2.2 µm is Aktisil™ VM56 vinyl modified from HOFMANN MINERAL.

The average particle size of the polymerizable pigment as measured according to ISO 13320-1 is preferably between 10 nm and 2.5 µm, more preferably between 15 nm and 250 nm, and most preferably between 20 nm and 150 nm.

If an inorganic pigment is used as polymerizable pigment, an improved scratch resistance and reduced tackiness of the ink layer is observed.

In a preferred embodiment, the aqueous UV curable inkjet ink includes 0.5 to 30% by weight of the polymerizable pigment, more preferably 1 to 25% by weight and most preferably 2.5 to 20% by weight all based on the total weight of the aqueous UV curable curable inkjet ink.

Polymerization Inhibitors

The aqueous UV curable inkjet ink may contain a polymerization inhibitor. Suitable polymerization inhibitors include phenol type antioxidants, hindered amine light stabilizers, phosphor type antioxidants, hydroquinone monomethyl ether, hydroquinone, t-butylcatechol, 2,6-di-tert.butyl-4-methylphenol (=BHT) and pyrogallol.

The inhibitor is preferably a polymerizable inhibitor.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total aqueous UV curable inkjet ink.

Inorganic Pigments

The aqueous UV curable inkjet ink may contain an inorganic pigment to improve the scratch resistance.

The aqueous UV curable inkjet ink may contain an inorganic pigment to improve the scratch resistance. Inorganic pigments can preferably be selected from the group consisting of titanium dioxide nanoparticles, aluminium oxide nanoparticles, zinc oxide nanoparticles and silicium dioxide nanoparticles.

The inorganic pigments preferably have an average particle size smaller than 100 nm, more preferably smaller than 50 nm.

Silica nanoparticles are preferred because they are usually small-sized and monodisperse. A monodisperse distribution is advantageous for the transparency of printed colour inks, thus enlarging the colour gamut.

The average particle size of inorganic pigment particles is preferably determined with a Brookhaven Instruments Particle Sizer BI90plus based upon the principle of dynamic light scattering.

Colorants

The colorant in the aqueous UV curable inkjet ink may be a dye but is preferably a colour pigment, as dyes tend to deteriorate during UV curing and are generally exhibit a poor light fastness, which is important for some specific applications, e.g. inkjet printed textiles.

The colour pigment may be present in the aqueous medium or partially of fully incorporated by reactive composite particles.

The colour pigments may be black, cyan, magenta, yellow, red, orange, violet, blue, green, brown, mixtures thereof, and the like. Any colour pigment may be chosen, such as from those disclosed by HERBST, Willy, et al. Industrial Organic Pigments, Production, Properties, Applications. 3rd edition. Wiley—VCH, 2004. ISBN 3527305769.

The colour pigment may be dispersed using a polymeric dispersant and optionally a dispersion synergist, or may be of the self-dispersible type.

A self-dispersible colour pigment can be dispersed without a polymeric dispersant. The advantage is that any possible interaction of the polymeric dispersant with the polymeric particles (1) of the aqueous UV curable inkjet ink is eliminated. Dispersion stability of a self-dispersible pigment is accomplished by electrostatic stabilization.

The technology for making self-dispersible pigments is well-known. For example, EP 1220879 A (CABOT) discloses pigments having attached a) at least one steric group and b) at least one organic ionic group and at least one amphiphilic counterion, wherein the amphiphilic counterion has a charge opposite to that of the organic ionic group that are suitable for inkjet inks. Also EP 906371 A (CABOT) discloses suitable surface-modified coloured pigment having attached hydrophilic organic groups containing one or more ionic groups or ionizable groups. Suitable commercially available self-dispersible colour pigments are, for example, the CAB-O-JET™ inkjet colorants from CABOT.

A particularly preferred self-dispersible colour pigment for a cyan aqueous inkjet ink is a ß-copper phthalocyanine pigment, more preferably C.I. Pigment Blue 15:3 or C.I. Pigment Blue 15:4.

Particularly preferred self-dispersible colour pigments for a red aqueous inkjet ink are C.I Pigment Red 254 and C.I. Pigment Red 122, and mixed crystals thereof.

Particularly preferred self-dispersible colour pigments for yellow aqueous inkjet ink are C.I Pigment Yellow 151, C.I Pigment Yellow 155 and C.I. Pigment Yellow 74, and mixed crystals thereof.

For the black ink, the self-dispersible colour pigment is preferably a carbon black pigment.

The colour pigment may also be dispersed using a polymeric dispersant. Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:
  statistically polymerized monomers (e.g. monomers A and B polymerized into ABBAABAB);
  alternating polymerized monomers (e.g. monomers A and B polymerized into ABABABAB);
  gradient (tapered) polymerized monomers (e.g. monomers A and B polymerized into AAABAABBABBB);
  block copolymers (e.g. monomers A and B polymerized into AAAAABBBBBB) wherein the block length of each of the blocks (2, 3, 4, 5 or even more) is important for the dispersion capability of the polymeric dispersant;
  graft copolymers (graft copolymers consist of a polymeric backbone with polymeric side chains attached to the backbone); and
  mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from ZENECA. A detailed list of non-polymeric as well as some polymeric dispersants is disclosed by MC CUTCHEON. Functional Materials, North American Edition. Glen Rock, N. J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polymeric dispersity PD smaller than 2, more preferably smaller than 1.75 and most preferably smaller than 1.5.

Commercial examples of polymeric dispersants are the following:
  DISPERBYK™ dispersants available from BYK CHEMIE GMBH;
  SOLSPERSE™ dispersants available from NOVEON;
  TEGO™ DISPERS™ dispersants from DEGUSSA;
  EDAPLAN™ dispersants from MÜNZING CHEMIE;
  ETHACRYL™ dispersants from LYONDELL;
  GANEX™ dispersants from ISP;
  DISPEX™ and EFKA™ dispersants from CIBA SPECIALTY CHEMICALS INC;
  DISPONER™ dispersants from DEUCHEM; and
  JONCRYL™ dispersants from JOHNSON POLYMER.

Particularly preferred for non-aqueous ink jet inks include Solsperse™ dispersants from NOVEON, Efka™ dispersants from CIBA SPECIALTY CHEMICALS INC and Disperbyk™ dispersants from BYK CHEMIE GMBH.

Particularly preferred dispersants for solvent based pigment dispersions are Solsperse™ 32000 and 39000 from NOVEON.

The polymeric dispersant is preferably used in the pigment dispersion in an amount of 2 to 600 wt %, more preferably 5 to 200 wt % based on the weight of the pigment.

In a particularly preferred embodiment, the polymeric dispersant is a copolymer comprising between 3 and 11 mol % of a long aliphatic chain (meth)acrylate wherein the long aliphatic chain contains at least 10 carbon atoms.

The long aliphatic chain (meth)acrylate contains preferably 10 to 18 carbon atoms. The long aliphatic chain (meth)acrylate is preferably decyl (meth)acrylate. The polymeric dispersant can be prepared with a simple controlled polymerization of a mixture of monomers and/or oligomers including between 3 and 11 mol % of a long aliphatic chain (meth)acrylate wherein the long aliphatic chain contains at least 10 carbon atoms.

A commercially available polymeric dispersant being a copolymer comprising between 3 and 11 mol % of a long aliphatic chain (meth)acrylate is Edaplan™ 482, a polymeric dispersant from MUNZING.

Suitable commercial pigment dispersions for the aqueous UV curable inkjet ink are D71 and D75 cyan, magenta, yellow and black dispersions from Diamond Dispersions In a preferred embodiment, the polymeric dispersant is crosslinked on the colour pigment surface so that it is practically prevented from desorption of the colour pigment surface. Such technology is known, for example, from WO 2014/106729 A (FUJIFILM).

Commercially available aqueous pigment dispersions having a cross-linked polymeric dispersant suitable for the aqueous UV curable inkjet ink include Pro-Jet™ APD 1000 yellow, magenta, cyan and black from FUJIFILM Imaging Colorants.

As colour pigments also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions.

Also mixtures of pigments may be used. For example, the inkjet ink includes a carbon black pigment and at least one pigment selected from the group consisting of a blue pigment, a cyan pigment, magenta pigment and a red pigment. It was found that such a black inkjet ink allowed easier and better colour management.

The pigment particles in the aqueous UV curable inkjet ink should be sufficiently small to permit free flow of the ink through the inkjet printing device, especially at the ejecting nozzles. It is also desirable to use small particles for maximum colour strength and to slow down sedimentation.

The average particle size of the pigment in the aqueous UV curable inkjet ink should be between 0.05 μm and 2 μm.

Preferably the average pigment particle size is between 0.07 µm and 1 µm, more preferably between 0.005 and 1 µm, particularly preferably between 0.075 and 0.5 µm and most preferably between 0.080 and 0.150 µm.

The average particle size of colour pigment particles is preferably determined with a Brookhaven Instruments Particle Sizer BI90plus based upon the principle of dynamic light scattering. The ink is preferably diluted to a pigment concentration of 0.002 wt %.

The colour pigment is used in the aqueous UV curable inkjet ink in an amount of 0.1 to 20 wt %, preferably 1 to 10 wt %, and most preferably 2 to 5 wt % based on the total weight of the pigmented aqueous UV curable inkjet ink. A pigment concentration of at least 2 wt % is preferred to reduce the amount of inkjet ink needed to produce the colour pattern, while a pigment concentration higher than 10 wt % tends to reduce the colour gamut for printing the colour pattern with print heads having a nozzle diameter of 20 to 50 µm.

A white aqueous UV curable inkjet ink preferably includes a pigment with a high refractive index, preferably a refractive index greater than 1.60, preferably greater than 2.00, more preferably greater than 2.50 and most preferably greater than 2.60. Such white pigments generally have a very high covering power, i.e. a limited amount of white ink is necessary to hide the colour and defects of the substrate. The most preferred white pigment is titanium dioxide.

The white inkjet ink preferably contains the white pigment in an amount of 5 wt % to 30 wt %, more preferably 8 to 25 wt % of white pigment based upon the total weight of the white inkjet ink.

The numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. A suitable particle size analyzer used was a Malvern™ nano-S available from Goffin-Meyvis.

Aqueous Medium

The polymeric particles are dispersed into an aqueous medium. The aqueous medium may consist of water, but preferably includes one or more organic solvents.

Other compounds, such as e.g. surfactants, colorants, alkaline compounds and light stabilizers, may be dissolved or dispersed in the aqueous medium.

The one or more organic solvents may be added for a variety of reasons. For example, it can be advantageous to add a small amount of an organic solvent to improve the dissolution of a compound in the aqueous medium.

The aqueous medium may contain an organic solvent as humectant to prevent the clogging of the nozzle, due to its ability to slow down the evaporation rate of inkjet ink, especially the water in the inkjet ink. The humectant is an organic solvent having a higher boiling point than water.

The aqueous medium may further comprise at least one thickener for viscosity regulation in the inkjet ink.

Suitable thickeners include urea or urea derivatives, hydroxyethylcellulose, carboxymethylcellulose, hydroxypropylcellulose, derived chitin, derived starch, carrageenan, pullulan, proteins, poly(styrenesulphonic acid), poly(styrene-co-maleic anhydride), poly(alkyl vinyl ether-co-maleic anhydride), polyacrylamid, partially hydrolyzed polyacrylamid, poly(acrylic acid), poly(vinyl alcohol), partially hydrolyzed poly(vinyl acetate), poly(hydroxyethyl acrylate), poly(methyl vinyl ether), polyvinylpyrrolidone, poly (2-vinylpyridine), poly(4-vinylpyridine) and poly(diallyldimethylammonium chloride).

The thickener is added preferably in an amount of 0.01 to 20 wt %, more preferably 0.1 to 10 wt % based on the inkjet ink.

Humectants

Suitable humectants include triacetin, N-methyl-2-pyrrolidone, 2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are 2-pyrrolidone, glycerol and 1,2-hexanediol, since the latter were found to be the most effective for improving inkjet printing reliability in an industrial environment.

The humectant is preferably added to the inkjet ink formulation in an amount of 0.1 to 35 wt % of the formulation, more preferably 1 to 30 wt % of the formulation, and most preferably 3 to 25 wt % of the formulation.

Opthothermal Converting Agents

The aqueous UV curable inkjet ink may contain an optothermal converting agent for the conversion of electromagnetic radiation into heat when the inkjet printed image is exposed to an infrared light source, such as a laser, a laser diode or a LED.

The presence of an optothermal converting agent allows for faster drying.

The optothermal converting agent may be any suitable compound absorbing in the wavelength range of emission by the infrared light source.

The optothermal converting agent is preferably an infrared dye as this allows easy handling into the inkjet ink. The infrared dye may be included into the aqueous medium, but is preferably included in the reactive particles or on the latex particles. In the latter, the heat transfer is usually much more effective.

Suitable examples of infrared dyes include, but are not limited to, polymethyl indoliums, metal complex IR dyes, indocyanine green, polymethine dyes, croconium dyes, cyanine dyes, merocyanine dyes, squarylium dyes, chalcogenopyryloarylidene dyes, metal thiolate complex dyes, bis (chalcogenopyrylo)polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, (metalized) azomethine dyes and combinations thereof.

The one or more optothermal converting agents are preferably present in the range of 0.1 to 10 wt % based on the total weight of the inkjet ink.

Surfactants

The aqueous UV curable inkjet ink may contain at least one surfactant. The surfactant(s) can be anionic, cationic, non-ionic, or zwitter-ionic and are usually added in a total quantity less than 5 wt % based on the total weight of the inkjet ink and particularly in a total less than 2 wt % based on the total weight of the inkjet ink.

Suitable surfactants for the aqueous UV curable inkjet ink include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoro surfactants (such as fluorinated hydrocarbons) and/or silicone surfactants.

The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes. Preferred commercial silicone surfactants include BYK™ 333 and BYK™ UV3510 from BYK Chemie.

Particularly preferred commercial fluorosurfactants are Capstone™ FS3100 from DU PONT, Tivida™ FL2500 from MERCK and Thetawet™ FS8150 from NEOCHEM GMBH.

pH-Adjusters

The aqueous UV curable inkjet ink may contain at least one pH adjuster. Suitable pH adjusters include NaOH, KOH, NEt$_3$, NH$_3$, HCl, HNO$_3$, H$_2$SO$_4$ and (poly)alkanolamines such as triethanolamine and 2-amino-2-methyl-1-propanol. Preferred pH adjusters are triethanol amine, NaOH and H$_2$SO$_4$.

The aqueous UV curable inkjet ink has a pH of preferably larger than 7.0, more preferably a pH between 7.5 and 12.0, most preferably between 8.0 and 11.0.

Stabilizers

The aqueous UV curable inkjet ink according to the present invention may further comprise at least one antioxidant for improving the storage stability of an image.

As the antioxidant for improving storage stability of an image, various organic and metal complex type fading preventives can be used in the invention. Organic fading preventives include hydroquinones, alkoxyphenols, dialkoxyphenols, phenols, anilines, amines, indanes, coumarones, alkoxyanilines and heterocycles, while metal complexes include nickel complexes and zinc complexes. More specifically, compounds as described in "Research Disclosure, No. 17643, VII, Section I or J, No. 15162, No. 18716, left column on page 650, No. 36544, page 527, No. 307105, page 872, and the patent cited in No. 15162, and compounds embraced in the formula of the typical compounds and compound examples described on pages 127 to 137 of JP 62215272 A (FUJI).

The stabilizer is added in an amount of 0.1 to 30 wt %, preferably 1 to 10 wt % based on the total weight of the aqueous UV curable inkjet ink.

Biocides

A biocide may be added to the aqueous medium to prevent unwanted microbial growth, which may occur in the ink-jet ink over time. The biocide may be used either singly or in combination.

Suitable biocides for the aqueous UV curable inkjet ink of the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added to the aqueous medium in an amount of 0.001 to 3 wt. %, more preferably 0.01 to 1.0 wt. %, each based on the aqueous UV curable inkjet ink.

Manufacturing of Inkjet Inks

A self-dispersible colour pigment can be simply mixed into the ink. If the colour pigment is not of the self-dispersible type, a colour pigment dispersion is first prepared. A colour pigment dispersion may be prepared by precipitating or milling the colour pigment in the dispersion medium in the presence of a polymeric dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

If the aqueous UV curable inkjet ink contains more than one pigment, the colour ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients will vary widely depending upon the specific materials and the intended applications. The contents of a milling mixture comprise the mill grind and the milling media. The mill grind comprises pigment, dispersant and a liquid carrier such as water. The pigment is usually present in the mill grind at 1 to 50 wt %, excluding the milling media. The weight ratio of pigment over dispersant is preferably 20:1 to 1:2.

The milling time can vary widely and depends upon the pigment, the selected mechanical means and residence conditions, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make the colour pigmented aqueous UV curable inkjet ink in the form of a concentrated mill grind, which is subsequently diluted to the appropriate concentration for use in the ink-jet printing system. This technique permits preparation of a greater quantity of aqueous UV curable inkjet ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, colour, hue, saturation density, and print area coverage for the particular application.

Inkjet Printing Methods

An inkjet printing method according to a preferred embodiment of the present invention includes, in order, at least the steps of:

a) jetting an aqueous UV curable inkjet ink according to the invention on a substrate;

b) applying heat and/or infrared light to the aqueous UV curable inkjet ink jetted on the substrate; and c) applying UV light to the aqueous UV curable inkjet ink jetted on the substrate.

The steps b) and c) may also be executed simultaneously.

In a preferred embodiment, the substrate used in the inkjet printing method is a polyvinylchloride substrate having its surface modified by the thiol compound present in the aqueous UV curable inkjet ink.

The inkjet printing method preferably uses infrared red light from a NIR source or a CIR source in step b) and UV light from UV LEDs in step c).

In a preferred embodiment of the inkjet printing method, the heat and/or infrared light applied in step b) is applied in such a manner, e.g. by a low-temperature, high-air-throughput, that surface temperature of the substrate does not exceed 50° C., preferably does not exceed 40° C.

Substrates

There is no real limitation on the type of substrate for inkjet printing the aqueous UV curable inkjet ink of the invention on. The substrates may have ceramic, metallic, glass, wood, paper or polymeric surfaces for printing. The substrate may also be primed, e.g. by a white ink.

The substrate may be porous, as e.g. textile, paper and card board substrates, or substantially non-absorbing substrates such as e.g. a plastic substrate having a polyethylene terephthalate surface.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm$^3$ or more.

There is no restriction on the shape of the substrate. It can be a flat sheet, such a paper sheet or a polymeric film or it can be a three dimensional object like e.g. a plastic coffee cup. The three dimensional object can also be a container like a bottle or a jerry-can for including e.g. oil, shampoo, insecticides, pesticides, solvents, paint thinner or other type of liquids.

In a preferred embodiment of the inkjet printing method, the substrate is selected from textile, glass, pharmaceutical and food packaging.

In a preferred embodiment of the inkjet printing method, the substrate is a rigid medium selected from rigid PVC, paperboard, corrugated and wood.

In a preferred embodiment of the inkjet printing method, the substrate is substrate suitable for soft signage applications, such as banners, posters, POP/POS displays, indoor wall graphics, tradeshow displays, parasols, flags, outdoor advertising and backdrops.

A major advantage of the current aqueous UV curable inkjet ink in textile inkjet printing is that not only a wide range of textiles can be printed upon, but that after the UV curing no post-treatments are necessary. For example, a classic washing process to remove dyes that are unfixed from the textile is not necessary. In addition, also many pre-treatments of textiles can be avoided. For example, where classic textile inkjet printing processes require the application of a water-soluble polymer to the textile prior to inkjet printing in order to prevent ink bleeding, this is usually not necessary with the aqueous UV curable inkjet ink of the present invention. The avoidance of these pre- and post treatment speed-up and simplify the manufacturing of inkjet printed textiles, resulting in an economical bonus. For example, no cumbersome ink swaps have to be performed in the inkjet printer, when changing the type of textile substrate. Also waste generated in the post-treatment can be avoided.

Suitable textiles can be made from many materials. These materials come from four main sources: animal (e.g. wool, silk), plant (e.g. cotton, flax, jute), mineral (e.g. asbestos, glass fibre), and synthetic (e.g. nylon, polyester, acrylic). Depending on the type of material, it can be woven or non-woven textile.

The textile substrate is preferably selected from the group consisting of cotton textiles, silk textiles, flax textiles, jute textiles, hemp textiles, modal textiles, bamboo fibre textiles, pineapple fibre textiles, basalt fibre textiles, ramie textiles, polyester based textiles, acrylic based textiles, glass fibre textiles, aramid fibre textiles, polyurethane textiles (e.g. Spandex or Lycra™), Tyvek™ and mixtures thereof.

Suitable polyester textile includes polyethylene terephthalate textile, cation dyeable polyester textile, acetate textile, diacetate textile, triacetate textile, polylactic acid textile and the like.

Applications of these textiles include automotive textiles, canvas, banners, flags, interior decoration, clothing, hats, shoes, floor mats, doormats, brushes, mattresses, mattress covers, linings, sacking, stage curtains, flame-retardant and protective fabrics, and the like. Polyester fibre is used in all types of clothing, either alone or blended with fibres such as cotton. Aramid fibre (e.g. Twaron) is used for flame-retardant clothing, cut-protection, and armor. Acrylic is a fibre used to imitate wools.

The inkjet inks of the invention are also suitable for inkjet printing on leather.

Inkjet Printing Devices

The aqueous UV curable inkjet ink may be jetted by one or more print heads ejecting small droplets of ink in a controlled manner through nozzles onto an ink-receiver surface, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type and thermal, electrostatic and acoustic drop on demand type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

For enhancing the reliability of the inkjet printing process, the aqueous UV curable inkjet ink is preferably jetted using a through flow print head, more preferably through flow piezoelectric print head. By using a through flow print head, the sedimentation of the colour pigment or the polymeric particles in the aqueous UV curable inkjet ink is effectively prevented. The recirculation of the aqueous UV curable inkjet ink causes enough agitation to keep the colour pigment and the polymeric particles well-dispersed.

The inkjet printing device preferably includes in order a thermal curing device and a UV curing device.

In a preferred embodiment, the drop size of the aqueous UV curable inkjet ink is smaller than 12 pL, preferably smaller than 10 pL and most preferably smaller than 8 pL.

In a preferred embodiment, the inkjet printing device is a so-called roll-to-roll inkjet printer, preferably including more than 8 through flow print heads having a nozzle plate longer than 4 cm. The nozzle plate is preferably provided with a non-wetting coating.

Curing Devices

For curing the aqueous UV free radical curable inkjet ink according to present invention two curing devices are present. A thermal curing device is preferably first used for drying the aqueous UV free radical curable inkjet ink, where after a UV curing device is used for UV curing the aqueous UV free radical curable inkjet ink.

Thermal Curing Devices

The inkjet device contains a thermal curing device for removing water and organic solvents in the inkjet printed image. The thermal curing device may consist out of different units.

A pre-heating device may be included in the inkjet printing device for heating the substrate prior to jetting. The pre-heating device may be an infrared radiation source as described here below, or may be a heat conduction device, such as a hot plate or a heat drum. A preferred heat drum is an induction heat drum.

The thermal curing device may include a dryer. Suitable dryers include devices circulating hot air, ovens, and devices using air suction. However for reducing energy consumption, preferably infrared radiation sources are used for thermal curing.

Preferred infrared radiation sources include near infrared radiation sources (NIR: 750-1400 nm) and short wave infrared radiation sources (SWIR:1400-3000 nm). An advantage is that glass lenses, which may be included in the curing device for focusing the infrared light on the substrate, transmit in this infrared region, contrary to mid-wavelength infrared light (MWIR: 3000-8000 nm) or long-wavelength infrared light (LWIR: 8000-15000 nm).

The most preferred infrared light source is a SWIR light source because the water absorption significantly increases at 1450 nm.

A commercial example of a SWIR light source is a carbon infrared emitter CIRTN available from HERAEUS, for example emitting at a wavelength of about 2000 nm.

Another preferred thermal curing device is a NIR source emitting near infrared radiation. NIR-radiation energy quickly enters into the depth of the inkjet ink layer and removes water and solvents out of the whole layer thickness, while conventional infrared and thermo-air energy predominantly is absorbed at the surface and slowly conducted into the ink layer, which results usually in a slower removal of water and solvents.

Commercially available NIR emitters are available from ADPHOS.

The thermal curing device may be, preferably at least in part, arranged in combination with the print head of the inkjet printer, travelling therewith so that the curing radiation is applied very shortly after jetting. This allows pinning the aqueous UV free radical curable inkjet ink when jetted on the substrate.

UV Curing Devices

The inkjet printing device includes also a UV curing device emitting UV radiation which is adsorbed by the photoinitiator or photoinitiating system of the aqueous UV curable inkjet ink for starting the polymerization reaction.

The UV curing device may be a so-called cold UV lamp, such as UV LEDs, but may also emit so much heat radiation, e.g. a high or low pressure mercury lamp, that it is also able to remove water and organic solvents in the inkjet printed image.

After drying, an aqueous UV curable inkjet ink is cured by exposure to ultraviolet radiation. The curing means may consist out of UV LEDs, because such an arrangement is advantageous for energy consumption compared to mercury lamps. The source of UV radiation may be an elongated radiation source extending transversely across the substrate to be cured.

Any ultraviolet light source, as long as part of the emitted light can be absorbed by the photoinitiator or photoinitiator system, may be employed as a radiation source, such as a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

In a preferred embodiment, the inkjet printing device contains UV LEDs with a wavelength larger than 360 nm, preferably UV LEDs with a wavelength larger than 380 nm, and most preferably UV LEDs with a wavelength of about 395 nm.

In a preferred embodiment, the inkjet printing device including a plurality of the aqueous UV curable inkjet inks of the invention is an inkjet device lacking a mercury lamp.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages for obtaining a fast curing speed and a high curing degree.

By using a thiol compound in the aqueous UV curable inkjet ink, the inkjet printing device does not require one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. The thiol compound allows to execute thiol-ene or thiol-yne click chemistry, which is insensitive to oxygen inhibition contrary to the conventional (meth)acrylate chemistry. The reason is that a hydroperoxy radical formed by the presence of oxygen can abstract a labile hydrogen from a thiol compound so that the thiol radical can still add to e.g. an acrylate monomer, while the hydroperoxy radical does not initiate the acrylate polymerization.

In a preferred embodiment, the inkjet printing device including a plurality of the aqueous UV curable inkjet inks of the invention is an inkjet device lacking an oxygen depletion unit.

EXAMPLES

Materials

All materials used in the following examples were readily available from standard sources such as Sigma-Aldrich (Belgium) and Acros (Belgium) unless otherwise specified. The water used in the examples was demineralised water.

Speedcure ITX is an isomeric mixture of 2-isopropylthioxanthone and 4-isopropylthioxanthone supplied by Lambson Specialty Chemicals.

Omnirad TPOL is 2,4,6-trimethylbenzoylphenylethoxyphosphine oxide supplied by IGM Resins BV Omnirad EHA is 2-ethylhexyl-4-(dimethylamino)benzoate supplied by Rahn AG Keycure 8179 is 2-(dimethylamino)-2-[(4-methylphenyl)methyl]-1-[4-(4-morpholinyl)phenyl]-1-butanone supplied by King Brother Chemical Company.

Omnimer PE-1 is a tetrafunctional thiol supplied by IGM Resins BV having the following structure:

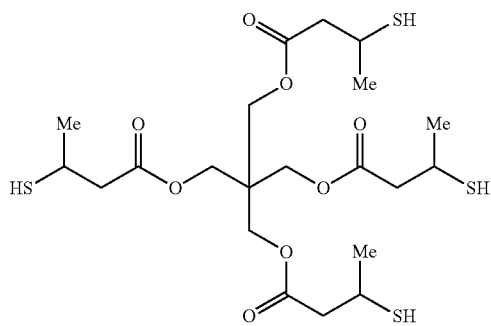 [SMILES: CC(S)CC(=O)OCC(COC(=O)CC(C)S)(COC(=O)CC(C)S)COC(=O)CC(C)S]

Pentaerythritol tetraallyl ether was supplied by Perstorp AB.

1,4-cyclohexanedimethanol divinyl ether was supplied by Aldrich.

HPX93 is a 54 w% styrene butadiene based aqueous resin dispersion supplied by Styron Europe GmbH.

Cab-O-Jet 450C is a cyan pigment dispersion supplied by Cabot Corporation.

PI-solution is a solution made by dissolving 3 g of Speedcure ITX, 3 g of Omnirad TPOL, 3 g of Omnirad EHA and 3 g of Keycure 8179 in 204 g ethyl acetate.

Lithene™ PM 4 is a low viscosity (0.8 Pa·s at 25° C.), low molecular weight (Mn=1500), liquid polybutadiene available from SYNTHOMER.

Genocure™ EPD is ethyl-4-dimethylaminobenzoate supplied by Rahn A.G.

Synperonic™ PE F127 is a non-ionic poly(ether) based polymeric dispersing agent, supplied by Croda.

Alkanol™ XC is a surfactant (CAS 68442-09-1) from DU PONT.

PET is an Astera™ X100.021 PET foil from Agfa-Gevaert N.V.

Measurement Methods

1. Adhesion

The adhesion was evaluated by a cross-cut test according to ISO2409:1992(E). Paints (International standard 1992-08-15) using a Braive No. 1536 Cross Cut Tester from BRAIVE INSTRUMENTS with spacing of a 1 mm between cuts and using a weight of 600 g, in combination with a Tesatape™ 4104 PVC tape. The evaluation was made in accordance with a criterion described by Table 3, where both the adhesion in the cross-cut and outside the cross-cut were evaluated.

TABLE 3

| Evaluation value | Criterion |
|---|---|
| 0 | Nothing removed, perfect adhesion. |
| 1 | Detachment of only very small parts of the cured layer, almost perfect adhesion. |
| 2 | Minor parts of the cured layer was removed by the tape, good adhesion |
| 3 | Parts of the cured layer were removed by the tape, poor adhesion. |
| 4 | Most of the cured layer was removed by the tape, poor adhesion. |
| 5 | The cured layer was completely removed from the substrate by the tape, no adhesion. |

2. Dry Rub Resistance

The dry rub resistance was evaluated by scratching each of the samples for 30 times using a Q-tip. The damage of the coating was evaluated visually and scored in accordance with a criterion described by Table 4.

TABLE 4

| Evaluation value | Criterion |
|---|---|
| 0 | no visual damage |
| 1 | minor surface damage. |
| 2 | clear surface damage |
| 3 | damage in the depth of the coating |
| 4 | complete removal of the coating |

3. Solvent Resistance

The solvent resistance was evaluated by scratching each of the samples for 30 times using a Q-tip saturated with isopropanol. The damage of the coating was evaluated visually and scored in accordance with a criterion described by Table 5.

TABLE 5

| Evaluation value | Criterion |
|---|---|
| 0 | no visual damage |
| 1 | minor surface damage. |
| 2 | clear surface damage |
| 3 | damage in the depth of the coating |
| 4 | complete removal of the coating |

4. Viscosity

The viscosity of the inkjet ink was measured using a Brookfield DV-II+ viscometer at 25° C. at 12 rotations per minute (RPM) using a CPE 40 spindle. This corresponds to a shear rate of 90 $s^{-1}$.

5. Surface Tension

The static surface tension of the radiation curable inks was measured with a KRÜSS tensiometer K9 from KRÜSS GmbH, Germany at 25° C. after 60 seconds.

Example 1

This example illustrates the preparation and properties of UV curable inkjet inks based upon thiol-ene latex particles in accordance with FIG. 1.A wherein the colorant (2) is omitted and optionally replaced by a polymerizable compound. Such a colourless inkjet ink can be used as an inkjet primer or an inkjet varnish.

Preparation of the UV Curable Inkjet Ink UV-1

A solution SOL-1 was made by adding 4 g of Omnimer PE-1 to 36 g of PI-solution.

18.52 g of HPX93 was diluted with 18.52 g water. 4 g of SOL-1 was added while gently stirring for half an hour. An additional 15 g water was added and ethyl acetate and 15 g water were removed under reduced pressure. An additional 15 g water was added for the second time and the mixture was evaporated under reduced pressure to remove the added 15 g water and potential residues of ethyl acetate in order to produce the UV curable inkjet ink UV-1.

Preparation of the UV Curable Inkjet Ink UV-2

A solution SOL-2 was made by adding 4 g of Omnimer PE-1 and 4 g pentaerythritol tetraallyl ether to 36 g of PI-solution.

18.52 g of HPX93 was diluted with 18.52 g water. 4.4 g of SOL-2 was added while gently stirring for half an hour. An additional 15 g water was added and ethyl acetate and 15 g water were removed under reduced pressure. An additional 15 g water was added for the second time and the mixture was evaporated under reduced pressure to remove the added 15 g water and potential residues of ethyl acetate in order to produce the UV curable inkjet ink UV-2.

Preparation of the UV Curable Inkjet Ink UV-3

A solution SOL-3 was made by adding 4 g of Omnimer PE-1 and 4 g 1,4-cyclohexanedimethanol divinyl ether to 36 g of the PI-solution.

18.52 g of HPX93 was diluted with 18.52 g water. 4.4 g of SOL-3 was added while gently stirring for half an hour. An additional 15 g water was added and ethyl acetate and 15 g water were removed under reduced pressure. An additional 15 g water was added for the second time and the mixture was evaporated under reduced pressure to remove the added 15 g water and potential residues of ethyl acetate in order to produce the UV curable inkjet ink UV-3.

Evaluation and Results

The UV curable inkjet inks UV-1 to UV-3 were coated on a 100 µm PET foil using a 10 µm wired bar. Two samples of each UV curable inkjet ink were prepared. The samples were dried and the coatings were left at room temperature for 24 hours.

One of the coated samples for each UV curable inkjet ink was cured, using a Fusion DRSE-120 conveyer, equipped with a Fusion VPS/1600 lamp (D-bulb). The samples were passed under the lamp six times at a belt speed of 20 m/min and at full power of the lamp.

The adhesion, the dry rub resistance and solvent resistance for the cured and non cured sample of each UV curable inkjet ink were evaluated. The evaluation results are summarized in Table 6.

TABLE 6

| Sample | UV cured | Adhesion in cross-cut | Adhesion outside cross-cut | Dry rub resistance | Solvent resistance |
|---|---|---|---|---|---|
| UV-1 | No | 0 | 0 | 4 | 4 |
| UV-1 | Yes | 0 | 0 | 1 | 1 |
| UV-2 | No | 0 | 0 | 4 | 3 |
| UV-2 | Yes | 0 | 0 | 1 | 0 |
| UV-3 | No | 0 | 0 | 4 | 4 |
| UV-3 | Yes | 0 | 0 | 1 | 1 |

From Table 6, it should be clear that, although no UV curing was necessary to obtain good adhesion, UV curing significantly improved the resistance against both mechanical damage and chemical attack. No odour was observed after UV curing.

Example 2

This example illustrates a UV curable inkjet ink containing a colour pigment and based upon latex particles charged with a photoinitiator and a thiol compound as shown in FIG. 1.A, further including pentaerythritol tetraallyl ether as a polymerizable compound.

Preparation of the UV Curable Inkjet Ink UV-4

18.52 g of HPX93 was diluted with 18.52 g water. 6.6 g of SOL-2, as made in Example 1, was added while gently stirring for half an hour. An additional 15 g water was added and ethyl acetate and 15 g water were removed under reduced pressure. An additional 15 g water was added for the second time and the mixture was evaporated under reduced pressure to remove the added 15 g water and potential residues of ethyl acetate. 0.8 g of Cab-O-Jet 450C was mixed into the curable resin particle dispersion in order to produce the UV curable inkjet ink UV-4

Evaluation and Results

The UV curable inkjet ink UV-4 was coated on a 100 µm PET foil, using a 10 µm wired bar. Two samples were prepared. The samples were dried and the coatings were left at room temperature for 24 hours.

One of the coated samples was UV cured, using a Fusion DRSE-120 conveyer, equipped with a Fusion VPS/1600 lamp (D-bulb). The samples were passed under the lamp six times at a belt speed of 20 m/min and at full power of the lamp.

The adhesion, the dry rub resistance and solvent resistance for the cured and non cured sample were evaluated. The results are summarized in Table 7.

TABLE 7

| Sample | UV cured | Adhesion in cross-cut | Adhesion outside cross-cut | Dry rub resistance | Solvent resistance |
|---|---|---|---|---|---|
| UV-4 | No | 0 | 5 | 4 | 4 |
| UV-4 | Yes | 0 | 0 | 1 | 1 |

From Table 7, it becomes apparent that UV curing counteracts the negative impact on adhesion of integrating colour pigments into the UV curable inkjet ink. No bad odour was observed after UV curing.

Example 3

This example illustrates how the jetting performance of a coloured UV curable inkjet ink in accordance to the invention may be improved. The incorporation an organic solvent, such as glycerol, prevents evaporation from the print head nozzles leading to clogged nozzles, and the inclusion of a surfactant allows to control the spreading of the ink jetted upon a substrate.

Preparation of Inkjet Inks UV-5 and UV-6

The UV curable inkjet inks UV-5 and UV-6 were prepared from the aqueous UV curable inkjet inks UV-2 and UV-3 by fine-tuning them for a certain inkjet print head. This fine-tuning included the addition of the components as listed in Table 8.

TABLE 8

| wt % of component | UV-5 | UV-6 |
|---|---|---|
| UV-2 | 35.0 | — |
| UV-3 | — | 35.0 |
| Cab-O-Jet ™ 450C | 17.5 | 17.5 |
| Glycerol | 46.5 | 46.5 |
| Alkanol ™ XC | 1.0 | 1.0 |

Evaluation and Results

The UV curable inkjet ink UV-5 had a pH of 7, viscosity of 10 mPas and a surface tension of 30 mN/m.

The UV curable inkjet ink UV-6 had a pH of 7, a viscosity of 10 mPas and a surface tension 30 mN/m.

The jetting performance of the inkjet inks UV-5 and UV-6 was evaluated using a Dimatix™ DMP2831 system, equipped with a standard Dimatix™ 10 pl print head. The ink was jetted at 22° C., using a firing frequency of 15 kHz, a firing voltage of 25 V, a standard waveform and a standard cartridge setting.

An image was printed on plane paper and the amount of failing nozzles was evaluated visually in the printed image. Both inks were readily printable without failing nozzles.

Example 4

Instead of charging photoinitiators, monomers and thiol compounds onto latex particles, it is possible to incorporate them into reactive composite particles. This example illustrates the integration of the reactive chemistry into a composite particle, allowing the formulation of an aqueous UV curable ink jet ink.

A solution of 3 g of Lithene™ PM4, 1 g of pentaerythritol-tetra-allylether, 4 g of Omnimer™ PE-1, 0.5 g of Keycure™ 8179, 0.5 g of Speedcure™ ITX, 0.5 g of Speedcure™ TPO-L and 0.5 g of Genocure™ EP in 30 g of ethyl acetate was prepared.

An aqueous solution of 5 g Synperonic™ PE F127 in 85 g water was prepared and the ethyl acetate solution prepared above was dispersed into the aqueous solution, using an Ultra Turrax at 20,000 rpm for five minutes. The ethyl acetate was removed under reduced pressure and the particle size was measured using a Zetasizer Nano-S (Malvern Instruments, Goffin Meyvis). The reactive composite particle had an average particle size of 241 nm, making it suitable to be integrated into an aqueous UV curable inkjet ink.

REFERENCE SIGNS LIST

TABLE 9

| 1 | Polymeric particle |
|---|---|
| 2 | Colorant |
| 3 | Photoinitiator |
| 4 | Thiol molecule |
| 5 | Inorganic pigment |
| 6 | Thiol pigment |
| 7 | Polymerizable pigment |
| 8 | PVC substrate |
| 9 | Surface modified PVC substrate |
| 10 | Aqueous medium |
| 11 | Polymerizable compound |
| 12 | Reactive composite particle part |
| 13 | Polymeric network |

The invention claimed is:

1. An aqueous UV curable inkjet ink comprising:
an aqueous medium;
a photoinitiator;
a thiol compound including at least two thiol groups;
polymeric particles including a polymer, an oligomer, or a monomer including ethylenically unsaturated polymerizable groups;
optionally a colorant; and
optionally a surfactant, and the surfactant is selected from the group consisting of fatty acid salts, ester salts of a higher alcohol, alkylbenzene sulphonate salts, sulphosuccinate ester salts and phosphate ester salts of a higher alcohol, ethylene oxide adducts of a higher alcohol, ethylene oxide adducts of an alkylphenol, ethylene oxide adducts of a polyhydric alcohol fatty acid ester, acetylene glycol and ethylene oxide adducts thereof, a fluoro surfactant, and a silicone surfactant selected from the group consisting of an alkoxylated silicone, a polyester modified silicone, an amine modified silicone, and an epoxy modified silicone; wherein no acrylates or methacrylates are included as a polymerizable compound.

2. The aqueous UV curable inkjet ink according to claim 1, wherein the polymeric particles are latex particles including the photoinitiator and/or the thiol compound charged on a surface of the latex particles.

3. The aqueous UV curable inkjet ink according to claim 1, wherein the polymeric particles are reactive composite particles incorporating therein the photoinitiator and/or the thiol compound.

4. The aqueous UV curable inkjet ink according to claim 1, wherein the photoinitiator is a polymerizable photoinitiator or a polymeric photoinitiator.

5. The aqueous UV curable inkjet ink according to claim 1, wherein the thiol compound includes a secondary thiol group.

6. The aqueous UV curable inkjet ink according to claim 5, wherein a molar ratio of thiol compounds including primary thiol groups over thiol compounds including at least one secondary thiol group is from 0 to 4.

7. The aqueous UV curable inkjet ink according to claim 1, wherein the thiol compound is an inorganic pigment including the at least two thiol groups on a surface of the inorganic pigment.

8. The aqueous UV curable inkjet ink according to claim 1, wherein the thiol compound is a silicon-based thiol compound.

9. The aqueous UV curable inkjet ink according to claim 1, wherein the colorant includes a color pigment.

10. The aqueous UV curable inkjet ink according to claim 1, wherein the polymer particles include a polymer including at least one monomeric unit selected from the group consisting of butadiene, chloroprene, and isoprene.

11. The aqueous UV curable inkjet ink according to claim 1, further comprising an inorganic pigment including ethylenically unsaturated polymerizable groups on a surface of the inorganic pigment.

12. An inkjet printing device comprising more than one aqueous UV curable inkjet ink according to claim 1.

13. An inkjet printing method comprising, in order, at least the steps of:
   jetting an aqueous UV curable inkjet ink according to claim 1 onto a substrate;
   applying heat and/or infrared light to the aqueous UV curable inkjet ink jetted onto the substrate; and
   applying UV light to the aqueous UV curable inkjet ink jetted onto the substrate.

14. The inkjet printing method according to claim 13, wherein the substrate includes polyvinylchloride having a surface modified by the thiol compound in the aqueous UV curable inkjet ink.

15. The inkjet printing method according to claim 13, wherein the step of applying infrared light includes applying red light from a NIR or a SWIR source, and the step of applying UV light includes applying UV light from UV LEDs.

16. The inkjet printing method according to claim 13, wherein the substrate is corrugated paperboard.

17. The inkjet printing method according to claim 16, wherein the step of applying infrared light includes applying red light from a NIR or a SWIR source, and the step of applying UV light includes applying UV light from UV LEDs.

18. The inkjet printing method according to claim 16, wherein the inkjet printing method is performed in a single pass printing process.

\* \* \* \* \*